United States Patent
Kosugi et al.

(10) Patent No.: US 11,556,626 B2
(45) Date of Patent: Jan. 17, 2023

(54) ELECTRONIC APPARATUS AND CONTROL METHOD

(71) Applicant: Lenovo (Singapore) Pte. Ltd., Singapore (SG)

(72) Inventors: Kazuhiro Kosugi, Kanagawa (JP); Masashi Nishio, Kanagawa (JP); Eri Shimizu, Kanagawa (JP)

(73) Assignee: Lenovo (Singapore) Pte. Ltd., Singapore (SG)

(*) Notice: Subject to any disclaimer, the term of this patent is extended or adjusted under 35 U.S.C. 154(b) by 169 days.

(21) Appl. No.: 17/083,759

(22) Filed: Oct. 29, 2020

(65) Prior Publication Data

US 2021/0357485 A1 Nov. 18, 2021

(30) Foreign Application Priority Data

May 14, 2020 (JP) .............................. JP2020-085163

(51) Int. Cl.
*G06F 21/84* (2013.01)
*G06F 3/01* (2006.01)
*G06F 21/32* (2013.01)
*G06V 40/16* (2022.01)

(52) U.S. Cl.
CPC .............. *G06F 21/32* (2013.01); *G06F 21/84* (2013.01); *G06F 3/011* (2013.01); *G06V 40/172* (2022.01)

(58) Field of Classification Search
None
See application file for complete search history.

(56) References Cited

U.S. PATENT DOCUMENTS

2015/0006927 A1 1/2015 Ono et al.
2017/0163847 A1* 6/2017 Ogura .................. H04N 1/4433

FOREIGN PATENT DOCUMENTS

| JP | 2003-255922 A | 9/2003 |
|---|---|---|
| JP | 2012-142778 A | 7/2012 |
| JP | 2013-137655 A | 7/2013 |
| JP | 2015-11541 A | 1/2015 |
| JP | 2016-103027 A | 6/2016 |
| JP | 2018-43416 A | 3/2018 |

* cited by examiner

*Primary Examiner* — Nicholas J Lee
(74) *Attorney, Agent, or Firm* — Osha Bergman Watanabe & Burton LLP

(57) ABSTRACT

An electronic apparatus includes: a detector that detects an object present within a predetermined detection range; and an embedded controller that based on a detection result by the detector determines that the object has left the electronic apparatus when the object is no longer detected within a first detection range of the predetermined detection range after the object has previously been detected within the first detection range, and determines that the object has approached the electronic apparatus after the object is detected within a second detection range in the predetermined detection range wider than the first detection range when no objects were previously detected within the predetermined detection range. While the object determined to have left is detected within the second detection range, the embedded controller determines that the object has re-approached based on a detection position of the object moving toward the first detection range.

12 Claims, 11 Drawing Sheets

ELECTRONIC APPARATUS AND CONTROL METHOD

TECHNICAL FIELD

The present invention relates to an electronic apparatus and a control method.

BACKGROUND

There is an electronic apparatus such as a PC (Personal Computer) which detects the approach and leave of a person to control operation. For example, Japanese Unexamined Patent Application Publication No. 2003-255922 discloses a terminal processing device which displays an operation screen in response to detecting an approaching person.

For example, there is an electronic apparatus such as a PC which turns off the screen and makes a transition to a standby state when a user gets away from (leaves) the electronic apparatus, and returns from the standby state and makes a transition to a usable state when the user gets closer to (approaches) the electronic apparatus. For example, it is desired by the user to make the transition to the standby state as soon as possible from the viewpoint of security when the user has left the electronic apparatus (when the user gets away from the electronic apparatus without the need to use the electronic apparatus) and to return from the standby state as soon as possible from the viewpoint of usability when the user has approached the electronic apparatus (when the user gets closer to use the electronic apparatus). In order to detect the leave of the user from the electronic apparatus and the approach of the user to the electronic apparatus as soon as possible, it is considered a method for setting a leave detection range in the case of leave detection narrow and an approach detection range in the case of approach detection wide.

However, when the leave detection range is set narrow and the approach detection range is set wide, the user may stay within the approach detection range even after the transition to the standby state due to the fact that the user went out of the leave detection range. In this case, if the user is determined to have approached, the electronic apparatus may return from the standby state even due to the fact that the user who has left just stays nearby without intention to use the electronic apparatus. However, it is inconvenient if it is set that the user is not determined to have approached unless the user goes out of the approach detection range because the user will need to approach the electronic apparatus again after getting far away from the electronic apparatus when the user really wants to use the electronic apparatus.

SUMMARY

One or more embodiments of the present invention provide an electronic apparatus and a control method for detecting the approach and leave of a user properly.

An electronic apparatus according to one or more embodiments of the present invention includes: a detection unit (i.e., detector) which detects an object present within a predetermined detection range; a leave determination unit which determines that the object has left when the object is no longer detected after the object is detected within a first detection range of the predetermined detection range based on the detection result by the detection unit; and an approach determination unit which determines that the object has approached when the object is detected after the object is not detected within a second detection range wider than the first detection range in the predetermined detection range based on the detection result by the detection unit, wherein while the object determined by the leave determination unit to have left is being detected within the second detection range, the approach determination unit determines that the object has approached based on the fact that the detection position of the object moves toward the first detection range.

The above electronic apparatus may be such that, in the case where the object determined by the leave determination unit to have left is being detected within the second detection range, when the amount of change in the detection position of the object in a direction of the first detection range is equal to or more than a predetermined value, the approach determination unit determines that the object has approached.

The above electronic apparatus may further include a processing unit (i.e., processor) which executes system processing, wherein upon becoming a state in which at least part of the system processing executed by the processing unit is limited, the approach determination unit may determine that the object has approached based on the fact that the detection position of the object moves toward the first detection range.

In the above electronic apparatus, when the object determined by the leave determination unit to have left is being detected within the second detection range, the approach determination unit may determine that the object has approached in response to the fact that the object is detected within the first detection range again.

In the above electronic apparatus, while the object determined by the approach determination unit to have approached is being detected within any range of the second detection range other than the first detection range, the leave determination unit may determine that the object has left in response to the fact that the object is no longer detected within the second detection range.

The above electronic apparatus may also be such that the detection range is a detection range defined by a distance and an angle with respect to the electronic apparatus, and the first detection range and the second detection range are so set that either one or both of the distance and the angle are different from each other.

The above electronic apparatus may further be such that the detection range is a detection range defined by the distance with respect to the electronic apparatus, the first detection range is a range from the electronic apparatus to a first detection distance, the second detection range is a range from the electronic apparatus to a second detection distance, and the second detection distance is longer than the first detection distance.

Further, the above electronic apparatus may be such that the detection range is a detection range defined by the angle with respect to the electronic apparatus, the first detection range is a range of a first detection field of view with respect to the electronic apparatus, the second detection range is a range of a second detection field of view with respect to the electronic apparatus, and the second detection field of view is an angle wider than the first detection field of view.

Further, the above electronic apparatus may be such that the detection range is a detection range defined by the angle with respect to the electronic apparatus, the first detection range is a range of a first detection field of view with respect to the electronic apparatus, the second detection range is a range of a second detection field of view with respect to the electronic apparatus, and the second detection field of view is an angle narrower than the first detection field of view.

The above electronic apparatus may further include: a processing unit which executes system processing based on a system; and an operation control unit (i.e., operation controller) which causes an operating state of the system to make a transition to a first operating state in which at least part of the system processing is limited when the object is determined by the leave determination unit to have left, and activates the operating state of the system from the first operating state when the object is determined by the approach determination unit to have approached.

A control method for an electronic apparatus according to one or more embodiments of the present invention includes: a step of causing a detection unit to detect an object present within a predetermined detection range; a step of causing a leave determination unit to determine that the object has left when the object is no longer detected after the object is detected within a first detection range of the predetermined detection range based on the detection result by the detection unit; a step of causing an approach determination unit to determine that the object has approached when the object is detected after the object is not detected within a second detection range wider than the first detection range in the predetermined detection range based on the detection result by the detection unit; and a step of causing the approach determination unit to determine that the object has approached based on the fact that the detection position of the object moves toward the first detection range while the object determined to have left is being detected within the second detection range.

The above-described embodiments of the present invention can properly detect the approach and leave of a user.

DETAILED DESCRIPTION

First Embodiment

First, an electronic apparatus 1 according to a first embodiment of the present invention will be described with reference to the accompanying drawings. The electronic apparatus according to the embodiment is an information processing apparatus such as a laptop PC (Personal Computer). Note that the electronic apparatus 1 may also be an information processing apparatus of any other type, such as a desktop PC, a tablet terminal device, or a smartphone.

The electronic apparatus 1 can make a transition at least between a normal operating state (power-on state) and a standby state as system operating states. The normal operating state is an operating state capable of executing processing without being particularly limited, which corresponds, for example, to S0 state defined in the ACPI (Advanced Configuration and Power Interface) specification. The standby state is a state in which at least part of system processing is limited. For example, the standby state is a state in which at least the display of a display unit appears to be OFF, i.e., an operating state lower in power consumption than the normal operating state. The standby state may be the standby state or a sleep state, or a state corresponding to modern standby in Windows (registered trademark) or S3 state (sleep state) defined in the ACPI specification.

In the following, a transition of the system operating state from the standby state to the normal operating state may be called "boot." In the standby state, since the activation level is generally lower than that in the normal operating state, the boot of the system of the electronic apparatus 1 leads to the activation of the operation of the system in the electronic apparatus 1.

Figure 1A:
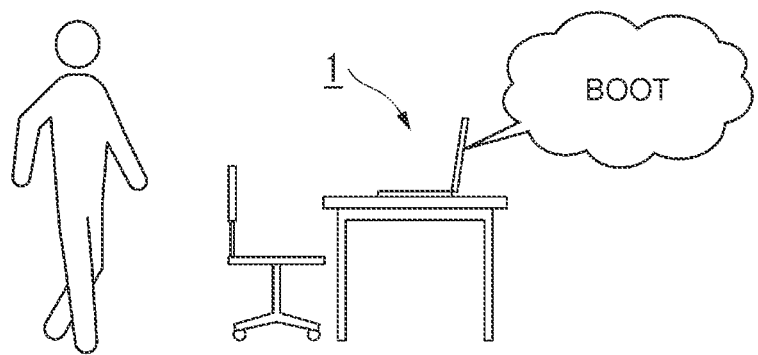
FIGS. 1A, 1B, and 1C are diagrams for describing an outline of an electronic apparatus according to a first embodiment.
Figure 1B:
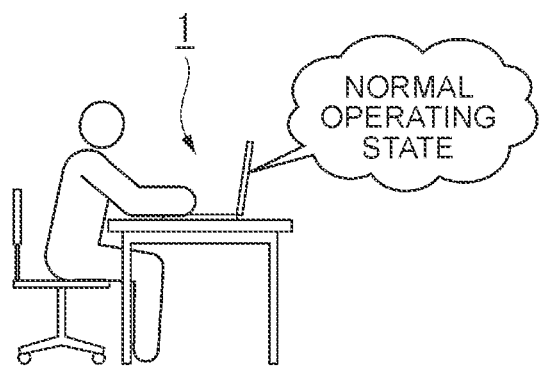
Figure 1C:
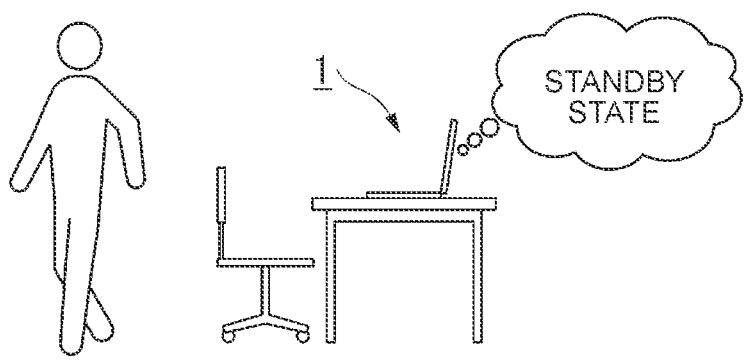

FIG. 1 is a diagram for describing an outline of the electronic apparatus 1 according to the embodiment. The electronic apparatus 1 includes a proximity sensor to be described later to detect a person present in the neighborhood of the electronic apparatus 1. This processing for detecting the presence of a person may also be called HPD (Human Presence Detection) processing. The electronic apparatus 1 detects a person present in the neighborhood of the electronic apparatus 1 to control the operating state of the electronic apparatus 1 based on the detection result. For example, as illustrated in FIG. 1A, when detecting a change from a state where no person is present in front of the electronic apparatus 1 (Absence) to a state where a person is present (Presence), that is, when detecting that the person approaches the electronic apparatus 1 (Approach), the electronic apparatus 1 automatically boots the system from the standby state to make a transition to the normal operating state. Further, in a state where the person is present in front of the electronic apparatus (Presence) as illustrated in FIG. 1B, the electronic apparatus 1 imposes such a restriction on the system not to make a transition to the standby state and to continue the normal operating state. Then, as illustrated in FIG. 1C, when detecting a change from the state where the person is present in front of the electronic apparatus 1 (Presence) to the state where no person is present (Absence), that is, when detecting that the person has left the electronic apparatus 1 (Leave), the electronic apparatus 1 causes the system to make a transition from the normal operating state to the standby state.

(External Structure of Electronic Apparatus)

Figure 2:
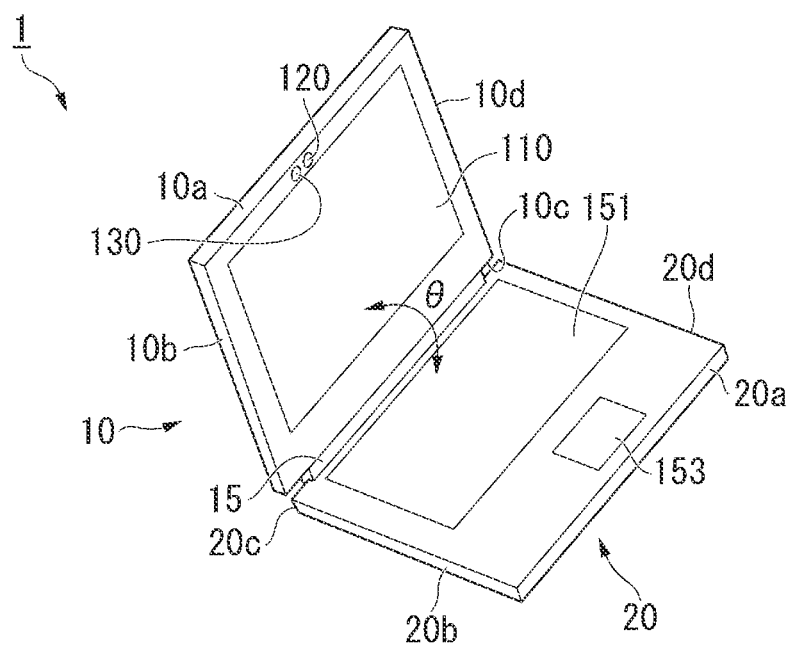
FIG. 2 is a perspective view illustrating an external structure example of the electronic apparatus according to the first embodiment.

FIG. 2 is a perspective view illustrating an external structure example of the electronic apparatus 1 according to the embodiment.

The electronic apparatus 1 includes a first chassis 10, a second chassis 20, and a hinge mechanism 15. The first chassis 10 and the second chassis 20 are coupled by using the hinge mechanism 15. The first chassis 10 is rotatable around an axis of rotation formed by the hinge mechanism 15 relative to the second chassis 20. The direction of the axis of rotation is parallel to side faces 10c and 20c on which the hinge mechanism 15 is placed.

The first chassis 10 is also called A cover or a display chassis. The second chassis 20 is also called C cover or a system chassis. In the following description, side faces on which the hinge mechanism 15 is provided among side faces of the first chassis 10 and the second chassis 20 are referred to as the side faces 10c and 20c, respectively. Among the side faces of the first chassis 10 and the second chassis 20, faces opposite to the side faces 10c and 20c are referred to as side faces 10a and 20a, respectively. In this figure, the direction from the side face 20a toward the side face 20c is referred to as "rear," and the direction from the side face 20c toward the side face 20a is referred to as "front." The right hand and left hand in the rearward direction are referred to as "right" and "left," respectively. The left side faces of the first chassis 10 and the second chassis 20 are referred to as side faces 10b and 20b, respectively, and right side faces are referred to as side faces 10d and 20d, respectively. Further, a state where the first chassis 10 and the second chassis 20 overlap each other and are completely closed (a state of open angle θ=0°) is referred to as a "closed state." The faces of the first chassis 10 and the second chassis 20 on the face-to-face sides in the closed state are referred to as "inner faces," and the faces opposite to the inner faces are referred to as "outer faces," respectively. Further, a state opposite to the closed state, where the first chassis 10 and the second chassis 20 are open, is referred to as an "open state."

The external appearance of the electronic apparatus 1 in FIG. 2 illustrates an example of the open state. The open state is a state where the side face 10a of the first chassis 10 and the side face 20a of the second chassis 20 are separated. In the open state, the inner faces of the first chassis 10 and the second chassis 20 appear so that the electronic apparatus 1 is expected to be able to carry out normal operation. The open state is a state where the open angle θ between the inner face of the first chassis 10 and the inner face of the second chassis 20 is equal to or more than a predetermined angle, typically about 100° to 130°. Note that the range of open angles θ to be the open state can be set arbitrarily according to the range of angles rotatable by the hinge mechanism 15 or the like.

A display unit 110 is provided on the inner face of the first chassis 10. The display unit 110 is configured to include a liquid crystal display (LCD) or an organic EL (Electro Luminescence) display, and the like. Further, an imaging unit 120 and a proximity sensor 130 are provided in a peripheral area of the display unit 110 on the inner face of the first chassis 10. The imaging unit 120 and the proximity sensor 130 are arranged side by side on the side of the side face 10a in the peripheral area of the display unit 110. Note that the proximity sensor 130 may be arranged on the side of the side face 10c in the peripheral area of the display unit 110.

In the open state, the imaging unit 120 captures an image of an object within a predetermined angle of view in a direction (frontward) to face the inner face of the first chassis 10. The predetermined angle of view is an imaging angle of view defined by an image sensor included in the imaging unit 120 and an optical lens provided in front of an imaging surface of the image sensor.

The proximity sensor 130 detects an object (for example, a person) present in the neighborhood of the electronic apparatus 1. For example, the proximity sensor 130 is an infrared distance sensor configured to include a light-emitting part for emitting infrared light and a light-receiving part for receiving reflected light which is the infrared light returned after being emitted and reflected on the surface of the object. The proximity sensor 130 detects, with a predetermined sampling frequency (for example, 1 Hz), light received by the light-receiving part, and outputs a detection signal according to the distance to the object (for example, the person) by using a triangulation method for calculating the distance based on the imaging position of the received light or a ToF (Time of Flight) method for converting, to a distance, a time difference from light-emitting to light-receiving, or the like.

Note that the proximity sensor 130 may be a sensor using infrared light emitted by a light-emitting diode, or a sensor using infrared laser emitting a light beam narrower in wavelength band than the infrared light emitted by the light-emitting diode. Further, the proximity sensor 130 is not limited to the infrared distance sensor, and it may be a sensor using any other method, such as an ultrasonic sensor or a sensor using an UWB (Ultra Wide Band) radar, as long as the sensor detects a distance to the object.

A keyboard 151 and a touch pad 153 are provided as an input device on the inner face of the second chassis 20. Note that a touch sensor may be included as the input device instead of or in addition to the keyboard 151 and the touch pad 153, and a mouse and an external keyboard may also be connected. When the touch sensor is provided, an operation area in which the touch sensor accepts operations may be an area corresponding to the display surface of the display unit 110. Further, a microphone used to input voice may be included in the input device.

In the closed state where the first chassis 10 and the second chassis 20 are closed, the display unit 110, the imaging unit 120, and the proximity sensor 130 provided on the inner face of the first chassis 10 are covered with the inner face of the second chassis 20, and put in a state of being disabled from fulfilling the functions thereof. In the state where the first chassis 10 and the second chassis 20 are completely closed, the open angle θ is 0°.

(Detection Range of Proximity Sensor)

Here, a detection range of the proximity sensor 130 will be described. In the open state, the proximity sensor 130 arranged on the inner face of the first chassis 10 detects an object (for example, a person) in a direction (frontward (a forward meshed area in FIG. 3)) to face the inner face of the first chassis 10. In the following description, a detection range detectable by the proximity sensor 130 is called a sensor detection range. The sensor detection range can be defined by a detection field of view FoV indicative of the angle detectable by the proximity sensor 130 and a detection distance KD indicative of a distance detectable by the proximity sensor 130.

In the sensor detection range, the electronic apparatus 1 sets different detection ranges between a detection range in the case of detecting the leave of a person from the electronic apparatus 1 and a detection range in the case of detecting the approach of a person to the electronic apparatus 1. In the following, the detection range in the case of detecting the leave of a person from the electronic apparatus 1 is called a leave detection range, and the detection range in the case of detecting the approach of a person to the electronic apparatus 1 is called an approach detection range. Further, a detection mode to detect the leave of a person from the electronic apparatus 1 is called a leave detection mode, and a detection mode to detect the approach of a person to the electronic apparatus 1 is called an approach detection mode.

For example, it may be desirable by each user to make a transition to the standby state as soon as possible from the viewpoint of security when the user has left the electronic apparatus (when the user no longer uses the electronic apparatus) and to return to the normal operating state as soon as possible from the viewpoint of usability when the user has approached the electronic apparatus (when the user wants to use the electronic apparatus). The leave detection range is set relatively narrow and the approach detection range is set relatively wide.

Figure 3:
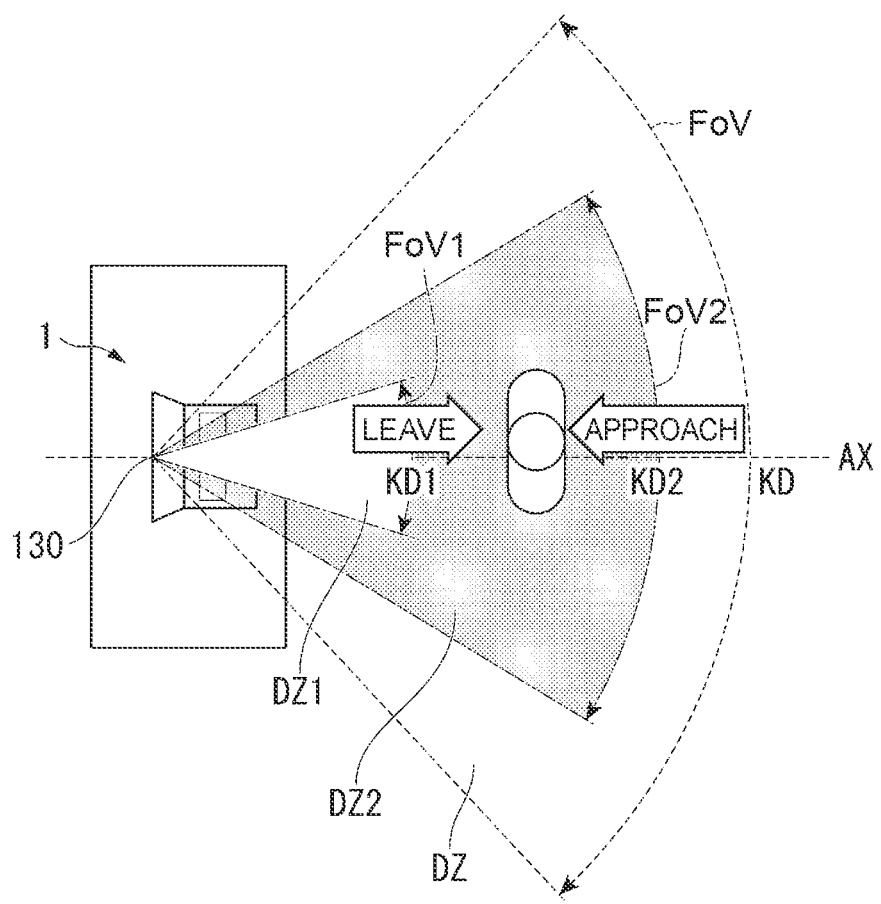
FIG. 3 is a diagram illustrating examples of detection ranges according to the first embodiment.

FIG. 3 is a diagram illustrating examples of detection ranges according to the embodiment. A sensor detection range DZ is indicated by the detection field of view FoV around an optical axis AX perpendicular to a detection surface of the proximity sensor 130 and a detection distance KD from the detection surface of the proximity sensor 130. Inside this sensor detection range DZ, a leave detection range DZ1 and an approach detection range DZ2 are set. The approach detection range DZ2 is a detection range including the leave detection range DZ1 and wider than the leave detection range DZ1. Here, the detection field of view and the detection distance of the leave detection range DZ1 are referred to as a leave detection field of view FoV1 and a leave detection distance KD1, respectively. Further, the detection field of view and the detection distance of the approach detection range DZ2 are referred to as an approach detection field of view FoV2 and an approach detection distance KD2, respectively. For example, the leave detection distance KD1 and the approach detection distance KD2 represent detection distances from the electronic apparatus 1 (from the proximity sensor 130), and the approach detection distance KD2 (for example, 150 cm) is a distance longer than the leave detection distance KD1 (for example, 70 cm). Further, the leave detection field of view FoV1 and the approach detection field of view FoV2 represent detection fields of view with respect to the electronic apparatus 1 (with respect to the proximity sensor 130), and the approach detection field of view FoV2 (for example, 90°) is an angle wider than the leave detection field of view FoV1 (for example, 30°).

When a person is no longer detected after the person is detected within the leave detection range DZ1, the electronic apparatus 1 determines that the person has left. In other words, when the person using the electronic apparatus 1 has left the electronic apparatus 1 and goes out of the leave detection range DZ1, the electronic apparatus 1 determines that the person has left. Further, when a person is detected after no person is detected within the approach detection range DZ2, the electronic apparatus 1 determines that the person has approached. In other words, when a person approaches and enters the approach detection range DZ2 after no person is present in the neighborhood of the electronic apparatus 1, the electronic apparatus 1 determines that the person has approached. Since the leave detection range DZ1 is set relatively narrow and the approach detection range DZ2 is set relatively wide, the leave of the person from the electronic apparatus 1 and the approach of the person to the electronic apparatus 1 can be detected as soon as possible.

Here, when the person determined to have left because the person went out of the leave detection range DZ1 wants to use the electronic apparatus 1 again, it is inconvenient that the person is not determined to have approached unless the person gets closer after the person goes out of the approach detection range DZ2. Therefore, in the embodiment, when the person determined to have left because the person went out of the leave detection range DZ1 stays within the approach detection range DZ2, the electronic apparatus 1 detects the approach of the person based on the fact that the detection position of the person moves toward the leave detection range DZ1. Here, a range outside of the leave detection range DZ1 and inside of the approach detection range DZ2 is also called a tracking range TZ. For example, the electronic apparatus tracks the detection position of the person staying in the tracking range, and determines that the person has approached when the detection position moves a certain distance or more toward the leave detection range DZ1 (that is, toward the electronic apparatus 1). A detection mode to track the detection position of the person staying within this tracking range TZ is called a tracking mode. The detection of the leave and approach of a person will be specifically described below with reference to FIG. 4 and FIG. 5.

Figure 4:
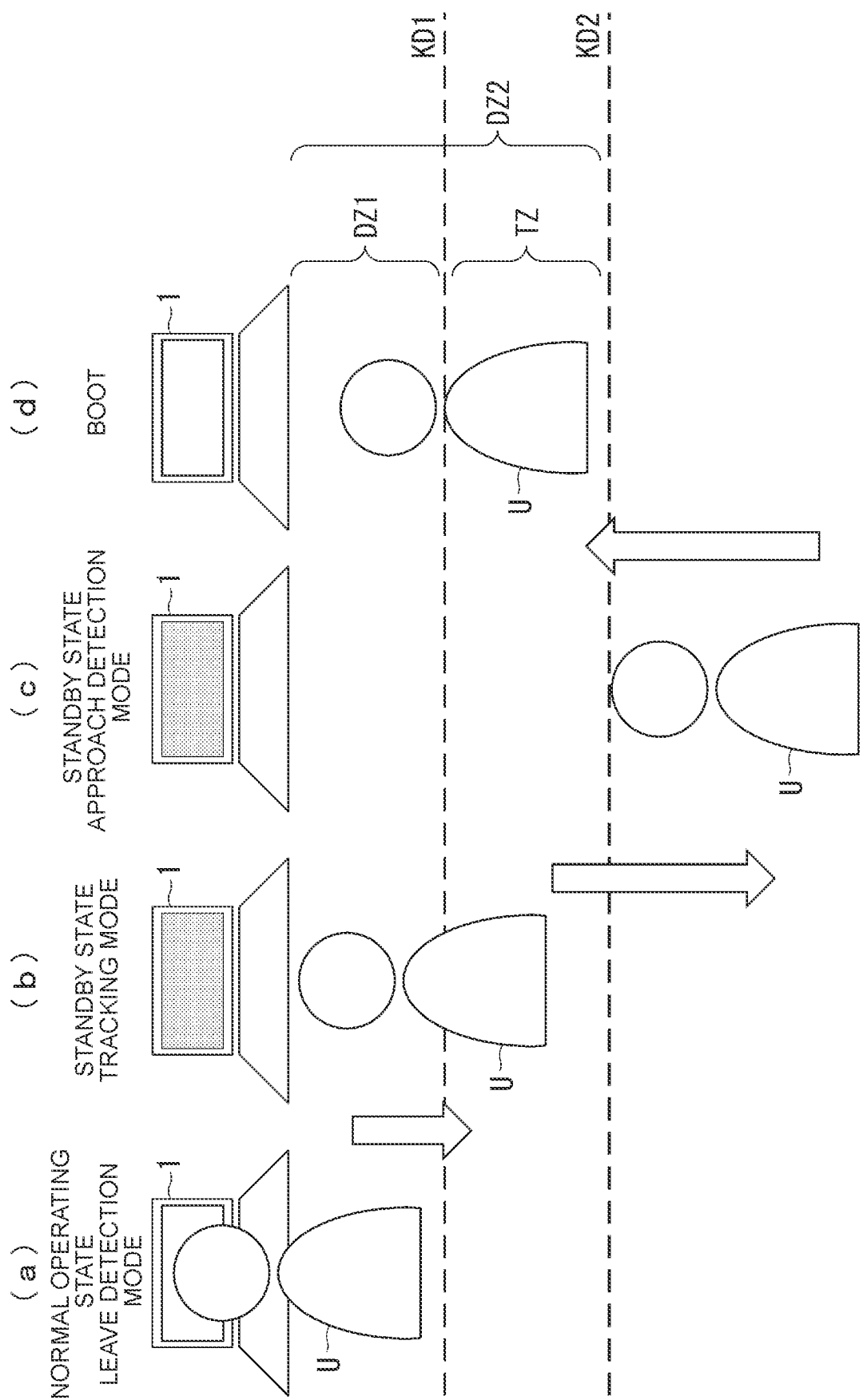
FIG. 4 is an explanatory illustration on the detection of the leave and approach of a person according to the first embodiment.
Figure 5:
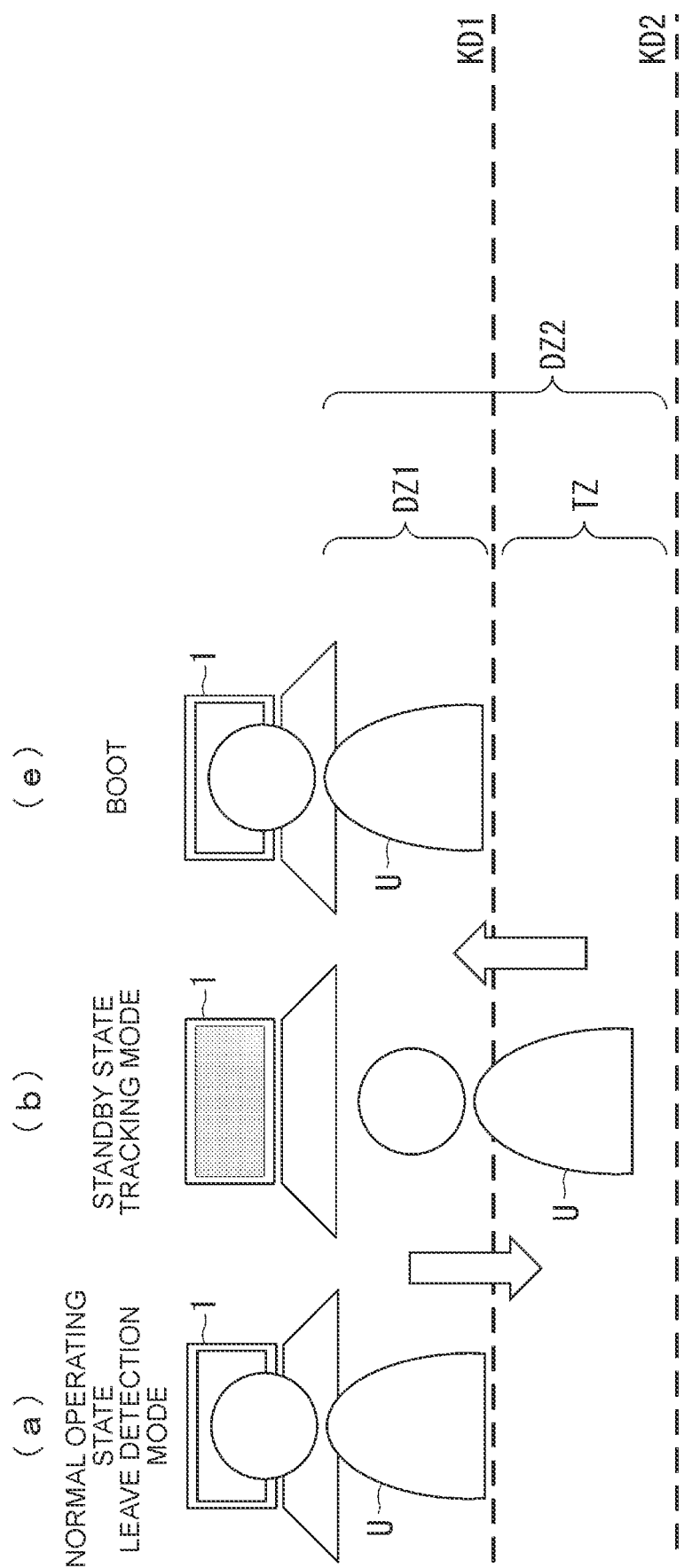
FIG. 5 is an explanatory illustration on approach detection in a tracking mode according to the first embodiment.

FIG. 4 and FIG. 5 are explanatory illustrations on the detection of the leave and approach of a person according to the embodiment. Here, only the detection distance is illustrated from the detection field of view and the detection distance in each detection range to facilitate the description. Referring first to FIG. 4, the transition of detection modes, leave detection in the leave detection mode and approach detection on the approach detection mode will be described.

(a) indicates a state where a person U is present in a position closer to the electronic apparatus 1 than the boundary of the leave detection distance KD1. At this time, the electronic apparatus 1 is in a state of detecting the person U within the leave detection range DZ1, which is the normal operating state. Further, the detection mode is the leave detection mode. The electronic apparatus 1 no longer detects the person U within the leave detection range DZ1 at the time when the person U within the leave detection range DZ1 goes away from the leave detection distance KD1, and determines that the person U has left.

(b) indicates a state where the person U indicated at (a) gets away from the electronic apparatus 1 over the boundary of the leave detection distance KD1 and goes out of the leave detection range DZ1. In response to determining that the person U has left, the electronic apparatus 1 makes a transition from the normal operating state to the standby state. In this case, since the electronic apparatus 1 is in a state of detecting the person U within the tracking range TZ, the electronic apparatus 1 makes a transition of the detection mode from the leave detection mode to the tracking mode.

(c) indicates a state where the person U indicated at (b) further gets away from the electronic apparatus 1 over the boundary of the approach detection distance KD2 and goes out of the approach detection range DZ2. At this time, the electronic apparatus 1 continues to be in the standby state. However, since the electronic apparatus 1 no longer detects the person U within the approach detection range DZ2

(within the tracking range TZ), the electronic apparatus 1 stops tracking the detection position, and makes a transition from the tracking mode to the approach detection mode. In short, the electronic apparatus 1 determines the person U going out of the approach detection range DZ2 to have left completely, and after that, determines the approach of a person using the approach detection range DZ2 in the approach detection mode.

(d) indicates a state where the person U indicated at (c) gets close to the electronic apparatus 1 and goes in the approach detection distance KD2 over the boundary of the approach detection distance KD2. At the time when the person U indicated at (c) gets closer over the boundary of the approach detection distance KD2, the electronic apparatus 1 detects the person U within the approach detection range DZ2 and determines that the person U has approached. The electronic apparatus 1 boots the system in response to determining that the person U has approached.

Referring next to FIG. 5, approach detection in the tracking mode will be described. States indicated at (a) and (b) in FIG. 5 are the same as the states indicated at (a) and (b) in FIG. 4. In the state where the electronic apparatus 1 is detecting the person U within the tracking range TZ as indicated at (b), the detection mode is the tracking mode. In the tracking mode, the electronic apparatus 1 tracks the detection position of the person U and determines that the person U has approached based on the fact that the detection position of the person U gets closer toward the leave detection range DZ1. For example, at the time when the person U indicated at (b) gets closer over the boundary of the leave detection distance KD1, the electronic apparatus 1 detects the person U within the leave detection range DZ1 and determines that the person U has approached.

(e) indicates a state where the person U indicated at (b) gets closer to the electronic apparatus 1 over the boundary of the leave detection distance KD1 and goes into the leave detection range DZ1. In this state, the electronic apparatus 1 boots the system in response to determining that the person U has approached.

In the example illustrated in FIG. 5, the example of determining that the person U has approached the electronic apparatus 1 when the person U gets close to the leave detection range DZ1 (to the boundary of leave detection distance KD1) (that is, to the electronic apparatus 1) in the tracking mode is described, but it may also be determined that the person U has approached the electronic apparatus 1 when the person U gets close over the boundary of a distance further closer to the electronic apparatus 1 than the boundary of the leave detection distance KD1. In other words, the threshold value used to determine that the person U has approached in the tracking mode may not be the same as the leave detection range DZ1 (the leave detection distance KD1).

Further, when the person U within the tracking range TZ indicated at (d) in FIG. 4 gets away from the electronic apparatus 1 over the boundary of the approach detection distance KD2 and goes out of the approach detection range DZ2 without returning to the leave detection range DZ1, since the electronic apparatus 1 no longer detects any person within the approach detection range DZ2 (within the tracking range TZ), the electronic apparatus 1 stops tracking the detection position, and makes a transition from the tracking mode to the approach detection mode. Further, the electronic apparatus 1 determines that the person U going out of the approach detection range DZ2 has completely left, and makes the transition from the normal operating state to the standby state.

(Hardware Configuration of Electronic Apparatus)

Figure 6:
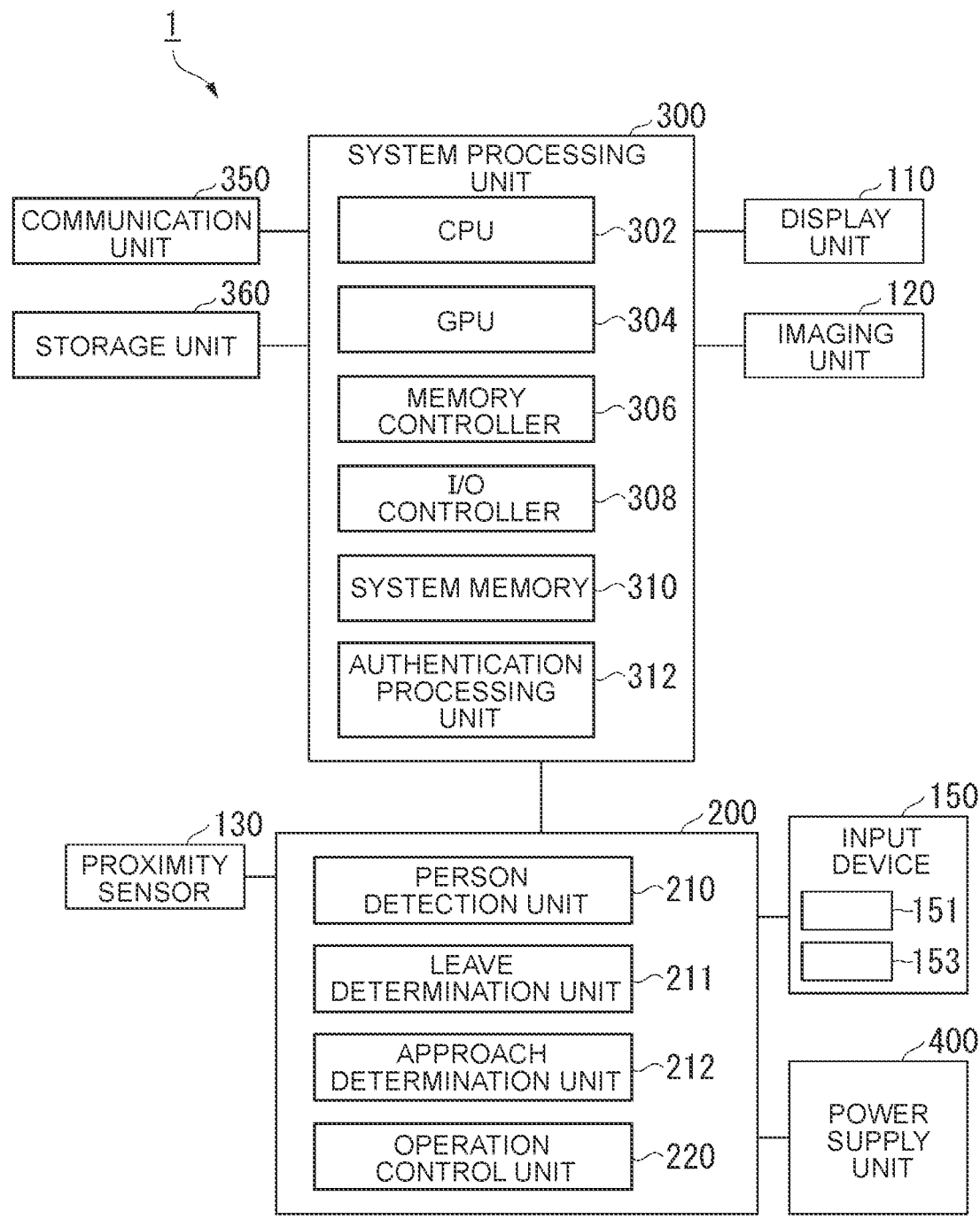
FIG. 6 is a schematic block diagram illustrating a hardware configuration example of the electronic apparatus according to the first embodiment.

FIG. 6 is a schematic block diagram illustrating a hardware configuration example of the electronic apparatus 1 according to the embodiment. The electronic apparatus 1 is configured to include the display unit 110, the imaging unit 120, the proximity sensor 130, an input device 150, an EC (Embedded Controller) 200, a system processing unit 300, a communication unit 350, a storage unit 360, and a power supply unit 400. The display unit 110 displays display data generated by system processing executed by the system processing unit 300.

The imaging unit 120 captures an image of an object within a predetermined angle of view in a direction (forward) to face the inner face of the first chassis 10, and outputs the captured image to the system processing unit 300. For example, when the face of a person approaching the electronic apparatus 1 is contained within the angle of view of the imaging unit 120, the imaging unit 120 captures a face image of the person, and outputs the captured face image to the system processing unit 300. The imaging unit 120 may be an infrared camera or a normal camera. The infrared camera is a camera including an infrared sensor as an image sensor. The normal camera is a camera including, as an image sensor, a visible light sensor for receiving visible light.

As described above, the proximity sensor 130 detects an object (for example, a person) present in a front direction (forward) of the first chassis 10, and outputs, to the EC 200, a detection signal based on the detection result. The detection signal includes information according to the detection position (angle and/or distance) of the object (for example, the person) detected within the sensor detection range.

The input device 150 is an input unit which accepts user input and is configured, for example, to include the keyboard 151 and the touch pad 153. In response to accepting operations on the keyboard 151 and the touch pad 153, the input device 150 outputs, to the EC 200, operation signals indicative of the contents of the operations.

The power supply unit 400 supplies power to each unit of the electronic apparatus 1 through a power system for supplying power to each unit according to the operating state of each unit. The power supply unit 400 includes a DC (Direct Current)/DC converter. The DC/DC converter converts a voltage of DC power, supplied from an AC (Alternate Current)/DC adapter or a battery pack, to a voltage required for each unit. The power with the voltage converted by the DC/DC converter is supplied to each unit through each power system. For example, the power supply unit 400 supplies power to each unit through each power system based on a control signal according to the operating state of each unit input from the EC 200.

The EC 200 is a microcomputer configured to include a CPU, a RAM (Random Access Memory), a ROM (Read Only Memory), an I/O (Input/Output) logic circuit, and the like. The CPU of the EC 200 reads a control program prestored in the ROM thereof and executes the read control program to fulfill the function. The EC 200 operates independently of the system processing unit 300 to control the operation of the system processing unit 300 and manage the operating state of the system processing unit 300. The EC 200 is connected to the proximity sensor 130, the input device 150, and the power supply unit 400.

For example, the EC 200 acquires, from the proximity sensor 130, the detection signal indicative of the detection result, executes HPD processing based on the detection result, and determines the approach or leave of a person. Further, the EC 200 controls the operating state of the system processing unit 300 according to the HPD processing. Further, the EC 200 communicates with the power supply unit 400 to acquire information on a battery state (remaining battery capacity, and the like) from the power supply unit 400, and to output, to the power supply unit 400, a control signal or the like in order to control the supply of power according to the operating state of each unit of the electronic apparatus 1. Further, the EC 200 acquires operation signals from the input device 150, and outputs, to the system processing unit 300, an operation signal related to processing of the system processing unit 300 among the acquired operation signals.

For example, as a functional configuration related to the HPD processing, the EC 200 includes a person detection unit 210, a leave determination unit 211, an approach determination unit 212, and an operation control unit 220. Based on the detection signal output from the proximity sensor 130, the person detection unit 210 detects, with a predetermined sampling frequency (for example, 1 Hz), an object (for example, a person) present in front of the electronic apparatus 1. In the following description, the fact that the person detection unit 210 detects an object (for example, a person) may be simply mentioned as "the person detection unit 210 detects a person." In other words, the fact that the person detection unit 210 detects a person includes both that the person detection unit 210 detects a person and that the person detection unit 210 detects an object other than the person. For example, based on the detection signal acquired from the proximity sensor 130, the person detection unit 210 detects a person present within the sensor detection range in front of the electronic apparatus 1. More specifically, the person detection unit 210 detects the presence or absence of a person within each of the leave detection range DZ1, the tracking range TZ, and the approach detection range DZ2, respectively.

When a person is no longer detected after the person is detected within the leave detection range DZ1 based on the detection result by the person detection unit 210, the leave determination unit 211 determines that the person has left the electronic apparatus 1. Further, when a person is detected after the person is not detected within the approach detection range DZ2 based on the detection result by the person detection unit 210, the approach determination unit 212 determines that the person has approached the electronic apparatus 1.

Further, while the person determined by the leave determination unit 211 to have left is being detected within the approach detection range DZ2 (that is, within the tracking range TZ), the approach determination unit 212 determines that the person has approached based on the fact that the detection position of the person moves toward the leave detection range DZ1 (that is, toward the electronic apparatus 1). For example, when the person determined by the leave determination unit 211 to have left is detected within the approach detection range DZ2 (that is, within the tracking range), the approach determination unit 212 determines that the person has approached in response to the fact that the person is detected within the leave detection range DZ1 again.

Note that while the person determined by the approach determination unit 212 to have approached in response to the fact that the person is detected after the person is not detected within the approach detection range DZ2 is being detected within the tracking range TZ, the leave determination unit 211 may determine that the person has left in response to the fact that the person is no longer detected within the approach detection range DZ2.

When the person is determined by the approach determination unit 212 to have approached, the operation control unit 220 causes the system processing unit 300 to boot the operating state of the system from the standby state. For example, at the bootup of the system, the operation control unit 220 outputs, to the power supply unit 400, a control signal to supply power necessary for the operation of each unit of the electronic apparatus 1. After that, the operation control unit 220 outputs a boot signal to the system processing unit 300 to instruct the system processing unit 300 to boot the system. When acquiring the booth signal, the system processing unit 300 boots the system to make a transition from the standby state to the normal operating state. When an operation to instruct booting (such as the pressing-down operation of a power button (not illustrated)) or an operation to release a screen lock (such as an operation on the keyboard 151 or the touch pad 153) is performed in the standby state, the operation control unit 220 may boot the operating state of the system from the standby state.

Further, when the person is determined by the leave determination unit 211 to have left, the operation control unit 220 causes the system processing unit 300 to make a transition of the operating state of the system from the normal operating state to the standby state. For example, the operation control unit 220 outputs a standby signal to the system processing unit 300 to give an instruction to cause the operating state of the system to make the transition from the normal operating state to the standby state. When acquiring the standby signal, the system processing unit 300 causes the system to make the transition from the normal operating state to the standby state. After that, the operation control unit 220 outputs a control signal to the power supply unit 400 to stop the supply of power unnecessary in the standby state.

Even when the person is not determined by the leave determination unit 211 to have left in the normal operating state, the operation control unit 220 may make the transition from the normal operating state to the standby state based on the fact that a predetermined condition is satisfied. The predetermined condition is, for example, that an operation to instruct the transition to the standby state (such as the pressing-down operation of a power button (not illustrated) or an operation to select the screen lock) is performed, or that the duration of non-operation has lasted for a preset period.

The system processing unit 300 is configured to include a CPU 302, a GPU (Graphic Processing Unit) 304, a memory controller 306, an I/O (Input-Output) controller 308, a system memory 310, and an authentication processing unit 312, where processes of various application software are executable on an operating system (OS) by system processing based on the OS. The CPU 302 and the GPU 304 may be collectively called a processor. As described above, as operating states of the system, at least the transition between the normal operating state and the standby state can be made.

When the operating state of the system is the standby state and the boot signal is input from the EC 200, the CPU 302 makes a transition from the standby state to the normal operating state. For example, in the case where the operating state is a sleep state, when power is supplied from the power supply unit 400 and the boot signal is input from the EC 200, the CPU 302 starts boot processing. In the boot processing, the CPU 302 detects and initializes the minimum devices such as the system memory 310, the storage unit 360, and the like (pre-boot). The CPU 302 then loads system firmware from the storage unit 360 into the system memory 310 to detect and initialize the other devices such as the communication unit 350 and the display unit 110 (post-processing). Initialization includes processing such as initial parameter settings. In the case of a transition (resume) from the sleep state to the normal operating state, part of the post-processing may be omitted. After completion of the boot processing, the CPU 302 starts execution of the system processing by the OS (boot). For example, when the operating state is the standby state and the boot signal is input from the EC 200, the CPU 302 resumes the execution of software which has been stopped.

When the execution of the system processing by the OS is started, the CPU 302 executes login authentication processing before allowing access to the OS, and the execution of the following system processing is paused until login is allowed in the login authentication processing. The login authentication processing is user authentication processing for determining whether a person using the electronic apparatus 1 is a preregistered, authorized user or not. As the login authentication, there are password authentication, face authentication, fingerprint authentication, and the like. Here, an example of using face authentication processing will be described. The CPU 302 instructs the authentication processing unit 312 to execute the face authentication processing based on a face image of the person captured by the imaging unit 120. When the authentication result by the authentication processing unit 312 is successful, the CPU 302 allows the login and resumes the execution of the paused system processing. On the other hand, when the authentication result by the authentication processing unit 312 is unsuccessful, the login is not allowed and the execution of the system processing is left stopped.

The GPU 304 is connected to the display unit 110. The GPU 304 executes image processing under the control of the CPU 302 to generate display data. The GPU 304 outputs the generated display data to the display unit 110. Note that the CPU 302 and the GPU 304 may be integrally formed as one core, or the load may be allocated between the CPU 302 and the GPU 304 formed as individual cores, respectively. The number of processors is not limited to one, and it may be plural.

The memory controller 306 controls reading data from and writing data to the system memory 310, the storage unit 360, and the like, by the CPU 302 and the GPU 304.

The I/O controller 308 controls input/output of data from the communication unit 350, the display unit 110, and the EC 200.

The system memory 310 is used as a reading area of an execution program of the processor and a working area to write processed data.

When receiving an instruction to execute face authentication processing from the CPU 302, the authentication processing unit 312 executes the face authentication processing based on a face image of a person captured by the imaging unit 120. The face image of the person captured by the imaging unit 120 is the face image of a person who approaches from the front of the electronic apparatus 1. The face authentication processing includes face detection processing and face matching processing. The face detection processing is processing for defining a face area as an area of a face from an image signal input from the imaging unit 120. The face matching processing has a step of determining the positions of plural face feature points (for example, mouth, eyes, nose, etc.) representing the features of the face from the face area, normalizing the position and size of the face area to be predetermined position and size, respectively, and defining a distribution of the normalized face feature points as image feature values, and a step of matching the defined image feature values with image feature values of the face image of a predetermined person to identify the person having image feature values with which matching is successful. In the storage unit 360, authentication information is set for each account as an authorized user who logs in with the account. The authentication information includes image feature values of the face image of the user. The authentication information is stored in further association with user information indicating the user. The user information may be information capable of identifying the user of the electronic apparatus 1, such as a user name, a user ID (Identifier), or the like.

When the result of matching between the face image of a person captured by the imaging unit 120 and set user authentication information can be determined to be a match, the authentication processing unit 312 determines that the face authentication is successful. On the other hand, for example, when a person other than the person using the electronic apparatus 1 cuts across in front of the electronic apparatus 1 by chance, the authentication processing unit 312 detects no face area from the image captured by the imaging unit 120. The authentication processing unit 312 outputs, to the CPU 302 and the EC 200, authentication information indicative of success/unsuccess of the face authentication.

The communication unit 350 is connected to other devices communicably through a wireless or wired communication network to transmit and receive various data. For example, the communication unit 350 is configured to include a wired LAN interface such as the Ethernet (registered trademark), a wireless LAN interface such as Wi-Fi (registered trademark), and the like. Note that the communication unit 350 may also be configured to include a USB (Universal Serial Bus) interface and a Bluetooth (registered trademark) interface.

The storage unit 360 is configured to include storage media, such as an HDD (Hard Disk Drive), an SSD (Solid State Drive), secure NVRAM (Non-Volatile RAM), a ROM (Read Only Memory), and the like. The HDD or the SSD stores the OS, device drivers, various programs such as applications, and various data acquired by the operation of the programs. In the secure NVRAM, authentication data used to authenticate each user are stored. Stored in the authentication data are identification information of each user and authentication information in association with each other. The secure NVRAM is protected (locked) not to be able to be accessed from an OS operating environment via the I/O controller 308. Note, however, that the lock is released upon power-on and reset of the CPU 302, and the system firmware is executed upon completion of the pre-boot to start the lock.

Next, the operation of processing according to the embodiment will be described.

(Operation of Person Detection Processing)

First, the operation of person detection processing executed by the electronic apparatus 1 will be described.

Figure 7:
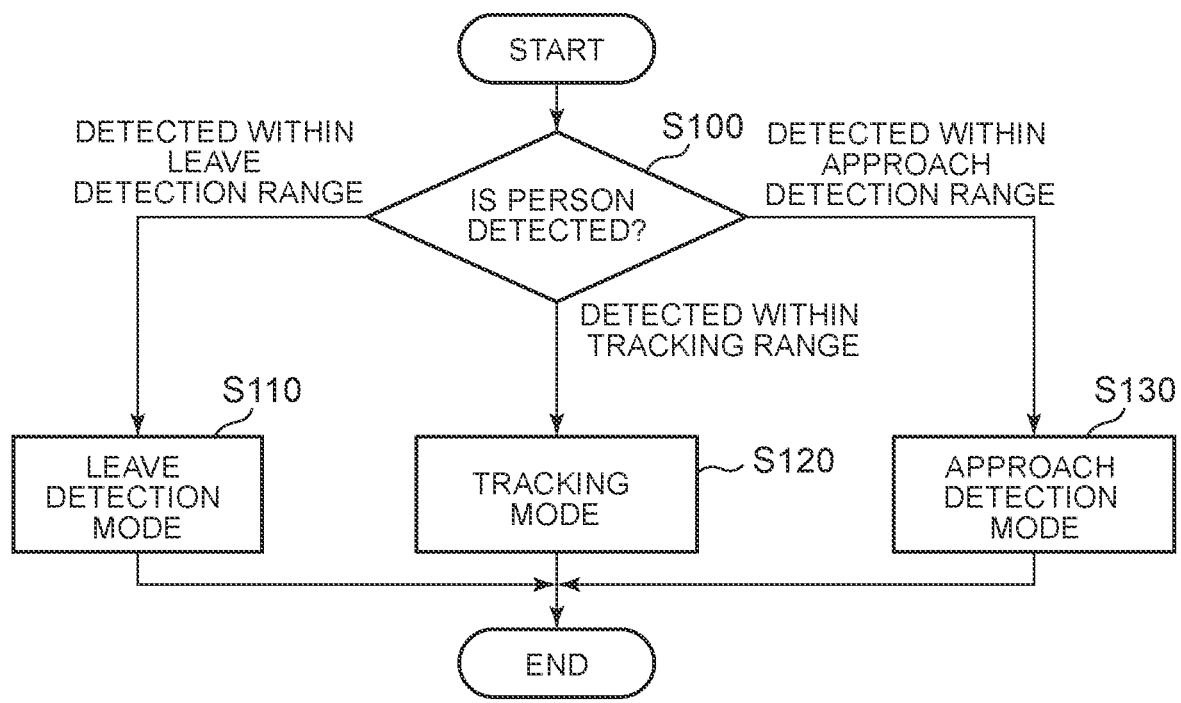
FIG. 7 is a flowchart illustrating an example of detection mode control processing according to the first embodiment.

FIG. 7 is a flowchart illustrating an example of detection mode control processing in the person detection processing according to the embodiment.

(Step S100) Based on the detection signal acquired from the proximity sensor 130, the person detection unit 210 detects a person present within the sensor detection range in front of the electronic apparatus 1. When a person is detected within the leave detection range DZ1, the person detection unit 210 sets the detection mode to the leave detection mode, and the procedure proceeds to processing in step S110.

(Step S110) In the leave detection mode, the electronic apparatus 1 executes leave detection processing to detect the leave of the person detected within the leave detection range DZ1. The details of the leave detection processing in the leave detection mode at step S110 will be described below with reference to FIG. 8.

Figure 8:
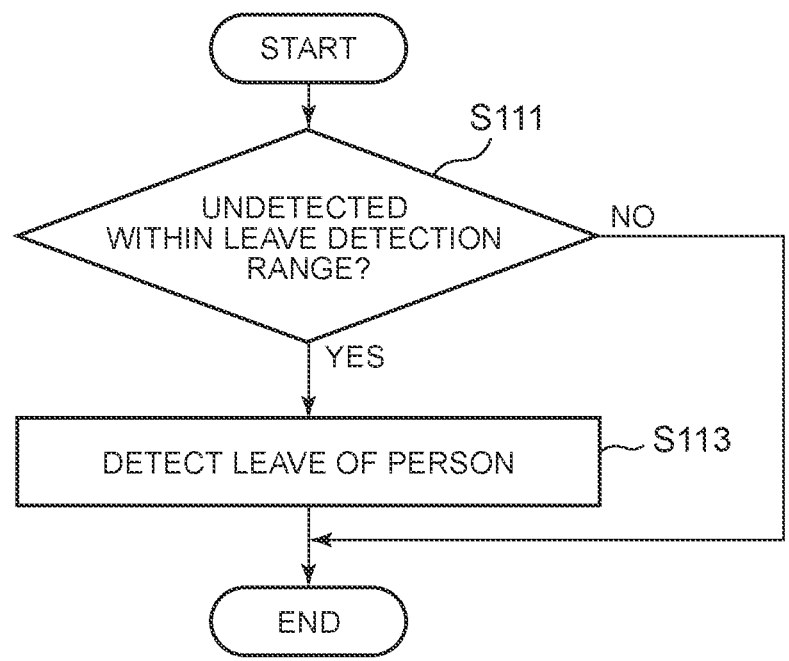
FIG. 8 is a flowchart illustrating an example of leave detection processing in a leave detection mode according to the first embodiment.

FIG. 8 is a flowchart illustrating an example of the leave detection processing in the leave detection mode according to the embodiment. Based on the detection result by the person detection unit 210, the leave determination unit 211 determines whether the person detected within the leave detection range DZ1 becomes undetected or not (step S111). When the person is no longer detected after the person is detected within the leave detection range DZ1 (YES), the leave determination unit 211 determines that the person has left (step S113). On the other hand, when the person is being detected within the leave detection range DZ1 (NO), the leave determination unit 211 does not perform the processing in step S113 (does not determine that the person has left).

Returning to FIG. 7, when detecting a person within the tracking range TZ in step S100, the person detection unit 210 sets the detection mode to the tracking mode, and the procedure proceeds to processing in step S120.

(Step S120) In the tracking mode, the electronic apparatus 1 executes tracking processing to detect the approach or leave of the person detected within the tracking range TZ. The details of leave or approach detection processing in the tracking mode at step S120 will be described below with reference to FIG. 9.

Figure 9:
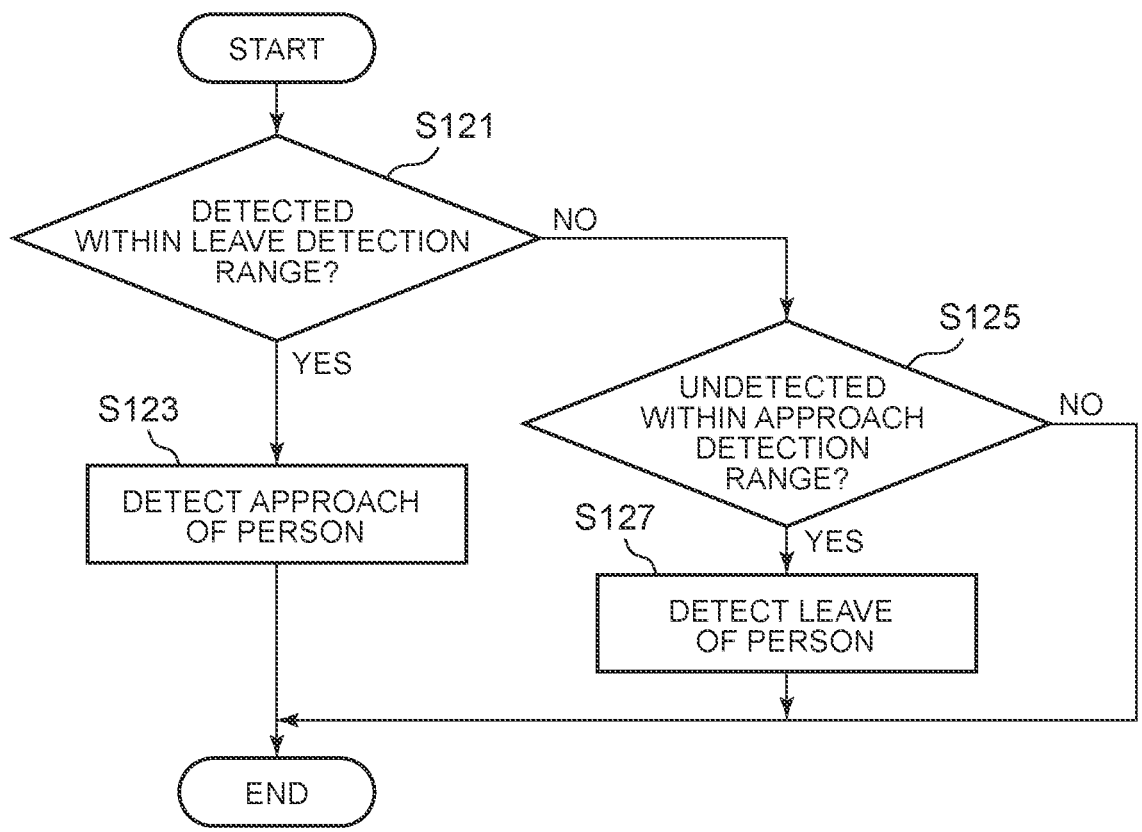
FIG. 9 is a flowchart illustrating an example of leave or approach detection processing in the tracking mode according to the first embodiment.

FIG. 9 is a flowchart illustrating an example of leave or approach detection processing in the tracking mode according to the embodiment. The approach determination unit 212 determines whether the detection position of the person detected within the tracking range TZ is moved toward the leave detection range DZ1 (that is, towards the electronic apparatus 1) or not. For example, based on the detection result by the person detection unit 210, the approach determination unit 212 determines whether a person is detected within the leave detection range DZ1 or not (step S121). When a person is detected after the person is not detected within the leave detection range DZ1 (YES), the approach determination unit 212 determines that the person has approached (step S123). In the state where the person is determined to have left in the tracking mode (the state of (b) in FIG. 4 and FIG. 5), the person is determined to have approached in response to the fact that the person is detected within the leave detection range DZ1, and a transition from the tracking mode to the leave detection mode is made. On the other hand, in the state where the person is determined to have approached in the tracking mode (the state of (d) in FIG. 4), a transition from the tracking mode to the leave detection mode is made while continuing the state of the approach of the person even when the person is detected within the leave detection range DZ1.

Further, when no person is detected within the leave detection range DZ1 in the step S121 (NO), the approach determination unit 212 proceeds to processing in step S125. In step S125, the leave determination unit 211 determines whether the person detected within the tracking range TZ goes out of the approach detection range DZ2 or not. For example, the leave determination unit 211 determines whether the person is undetected within the approach detection range DZ2 or not. When the person is no longer detected within the approach detection range DZ2 (NO), the leave determination unit 211 determines that the person has left. Thus, in the state where the person is determined to have approached in the tracking mode (the state of (d) in FIG. 4), the person is determined to have left in response to the fact that the person is no longer detected with in the approach detection range DZ2, and a transition from the tracking mode to the approach detection mode is made. On the other hand, in the state where the person is determined to have left in the tracking mode (the state of (b) in FIG. 4 and FIG. 5), the person is determined to have completely left in response to the fact that the person is no longer detected within the approach detection range DZ2, and a transition from the tracking mode to the approach detection mode is made.

Returning to FIG. 7, when no person is detected within the approach detection range DZ2 in step S100, the person detection unit 210 sets the detection mode to the approach detection mode, and the procedure proceeds to processing in step S130.

(step S130) In the approach detection mode, the electronic apparatus 1 executes approach detection processing to detect the approach of a person from the outside of the approach detection range DZ2. The details of the approach detection processing in the approach detection mode at step S130 will be described with reference to FIG. 10.

Figure 10:
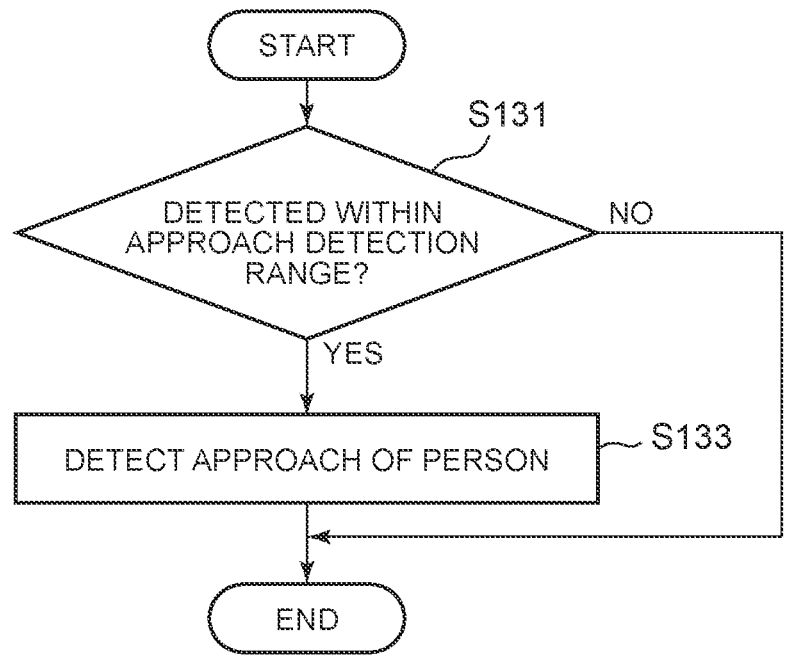
FIG. 10 is a flowchart illustrating an example of approach detection processing in an approach detection mode according to the first embodiment.

FIG. 10 is a flowchart illustrating an example of the approach detection processing in the approach detection mode according to the embodiment. Based on the detection result by the person detection unit 210, the approach determination unit 212 determines whether a person is detected within the approach detection range DZ2 or not (step S131). When a person is detected within the approach detection range DZ2 (YES), the approach determination unit 212 determines that the person has approached (step S133). On the other hand, when no person is detected within the approach detection range DZ2 (NO), the approach determination unit 212 does not perform the processing in step S133 (it does not determine that a person has approached).

(Operation of Operation Control Processing)

Figure 11:
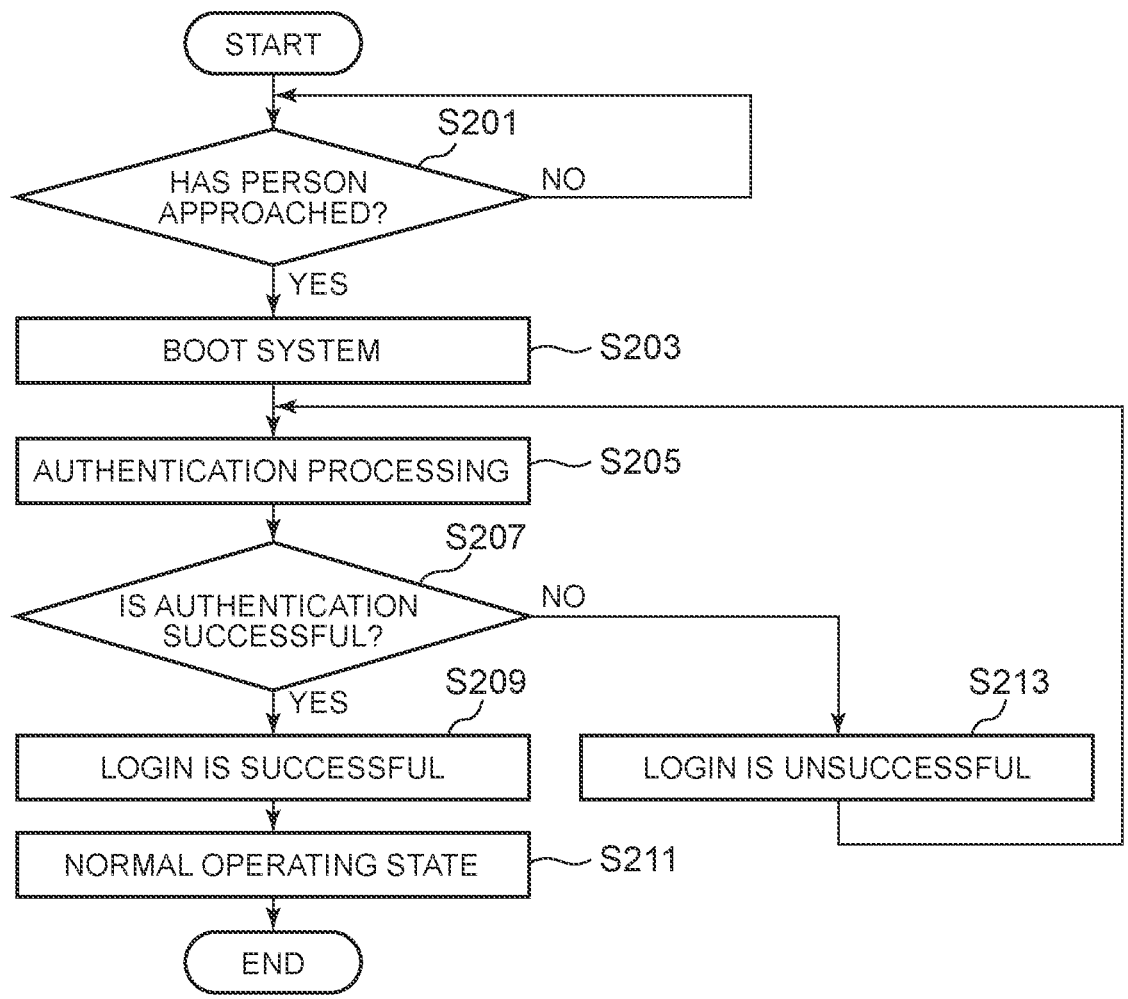
FIG. 11 is a flowchart illustrating an example of boot control according to the first embodiment.

Next, the operation of operation control processing in which the electronic apparatus 1 controls the operating state of the system according to the result of the person detection processing will be described. Referring first to FIG. 11, the operation of boot processing to boot the system in response to the fact that the electronic apparatus 1 detects the approach of a person will be described.

FIG. 11 is a flowchart illustrating an example of the boot processing according to the embodiment. Here, it is assumed that the electronic apparatus 1 is placed open on a desk or the like in the standby state.

(Step S201) Based on the detection result by the person detection unit 210, the approach determination unit 212 determines whether a person has approached or not. For example, when a person is detected after the person is not detected within the approach detection range DZ2, the approach determination unit 212 determines that the person has approached. The approach determination unit 212 may also determine that a person has approached based on the fact that the detection position of the person detected within the tracking range TZ moves toward the leave detection range DZ1 (that is, toward the electronic apparatus 1). When determining that the person has approached the electronic apparatus 1 (YES), the approach determination unit 212 proceeds to processing in step S203. On the other hand, when determining that the person does not approach the electronic apparatus 1 (NO), the approach determination unit 212 performs the processing in step S201 again.

(Step S203) The operation control unit 220 causes the system processing unit 300 to boot the system from the standby state. Specifically, when booting the system, the operation control unit 220 outputs the control signal to the power supply unit 400 to supply power necessary for the operation of each unit of the electronic apparatus 1. Further, the operation control unit 220 outputs the boot signal to the CPU 302 to give an instruction of booting the system. When acquiring the boot signal, the CPU 302 starts the boot processing. Then, the CPU 302 proceeds to processing in step S205.

(Step S205) The CPU 302 executes login authentication. For example, the CPU 302 executes login authentication processing by face authentication using a face image of the person captured by the imaging unit 120. Specifically, the CPU 302 instructs the authentication processing unit 312 to execute face authentication processing based on the face image of the person captured by the imaging unit 120, and acquires the authentication result from the authentication processing unit 312. Then, the CPU 302 proceeds to processing in step S207.

(Step S207) The CPU 302 determines whether the authentication result is successful or not. When the authentication result is successful (YES), the CPU 302 proceeds to processing in step S209. On the other hand, when the authentication result is unsuccessful (NO), the CPU 302 proceeds to processing in step S213.

(Step S209) When the authentication result is successful, the CPU 302 gives a notification that the login is successful (for example, displays the notification on the display unit 110) to continue the boot processing. Then, the CPU proceeds to processing in step S211.

(Step S211) The CPU 302 completes the boot processing and makes a transition to the normal operating state.

(Step S213) When the authentication result is unsuccessful, the CPU 302 gives a notification that the login is unsuccessful (for example, displays the notification on the display unit 110), and returns to the authentication processing in step S205. When the authentication processing is unsuccessful continuously a predetermined number of times, the CPU 302 may stop the authentication processing and make a transition to a state of disabling the login authentication processing.

Figure 12:
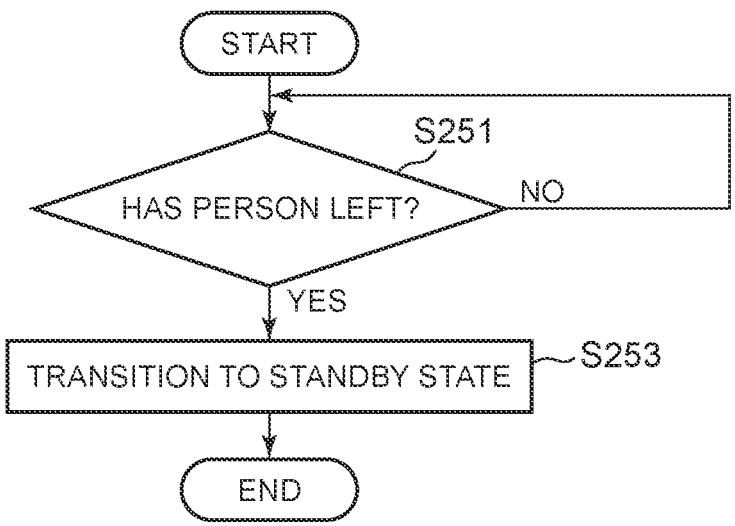
FIG. 12 is a flowchart illustrating an example of standby state transition processing according to the first embodiment.

Referring next to FIG. 12, the operation of standby state transition processing to make a transition of the system from the normal operating state to the standby state in response to detecting the leave of a person from the electronic apparatus 1 will be described.

FIG. 12 is a flowchart illustrating an example of the standby state transition processing according to the embodiment. Here, it is assumed that the electronic apparatus 1 is placed open on the desk or the like in the normal operating state.

(Step S251) Based on the detection result by the person detection unit 210, the leave determination unit 211 determines whether a person has left the electronic apparatus 1 or not. For example, when a person no longer detected after the person is detected within the leave detection range DZ1, the leave determination unit 211 determines that the person has left the electronic apparatus 1. The leave determination unit 211 may also determine that the person has left in response to the fact that the person detected within the tracking range TZ is no longer detected within the approach detection range DZ2. When determining that the person has left the electronic apparatus 1 (YES), the leave determination unit 211 proceeds to processing in step S253. On the other hand, when determining that the person does not leave the electronic apparatus 1 (NO), the leave determination unit 211 performs the processing in step S251 again.

(Step S253) The operation control unit 220 causes the system processing unit 300 to make the transition of the system from the normal operating state to the standby state. Specifically, the operation control unit 220 outputs the standby signal to the CPU 302 to give an instruction to cause the system to make the transition to the standby state. When acquiring the standby signal, the CPU 302 makes the transition of the system from the normal operating state to the standby state. Further, the operation control unit 220 outputs the control signal to the power supply unit 400 to stop the supply of power unnecessary in the standby state.

As described above, in the electronic apparatus 1 according to the embodiment, the person detection unit 210 (an example of a detection unit) detects a person (an example of an object) present within the sensor detection range DZ (an example of a predetermined detection range). Further, based on the detection result by the person detection unit 210, when a person detected within the leave detection range DZ1 (an example of a first detection range) of the sensor detection range DZ is no longer detected, the leave determination unit 211 determines that the person has left. Further, based on the detection result by the person detection unit 210, when a person is detected after the person is not detected within the approach detection range DZ2 (an example of a second detection range) wider than the leave detection range DZ1 in the sensor detection range DZ, the approach determination unit 212 determines that the person has approached. Further, while the person determined by the leave determination unit 211 to have left is being detected within the approach detection range DZ2, the approach determination unit 212 determines that the person has approached based on the fact that the detection position of the person moves toward the leave detection range DZ1.

Thus, the electronic apparatus 1 can detect the approach and leave of a user properly. For example, the electronic apparatus 1 can detect the leave of a person even when the person gets slightly away from the electronic apparatus 1, and detect the approach of a person as soon as possible when the person approaches from a distance (approaches to use the electronic apparatus 1). Further, even in the case where the leave of a person is detected by getting slightly away from the electronic apparatus 1, the person can approach straight without the need to approach after once getting far away (going out of the approach detection range DZ2) when the person wants to use the electronic apparatus 1. In this case, the electronic apparatus 1 can detect the approach of the person properly.

For example, when the person determined by the leave determination unit 211 to have left is being detected within the approach detection range DZ2, the approach determination unit 212 determines that the person has approached in response to the fact that the person is detected within the leave detection range DZ1 again.

Thus, even in the case where the leave of a person is detected by getting a little distance away from the electronic apparatus 1, when the person wants to use the electronic apparatus 1 again, the electronic apparatus 1 can detect the approach of the person properly as long as the person returns to the position before getting away without the need for the person to approach again (re-approach) after once getting far away.

Further, since the electronic apparatus 1 can detect the approach of a person as long as the person stretches out his or her hands and the hands are detected within the leave detection range DZ1 without the need for the person to move his or her body, it is convenient.

Further, while the person determined by the approach determination unit 212 to have approached is being detected outside of the leave detection range DZ1 in the approach detection range DZ2, the leave determination unit 211 determines that the person has left in response to the fact that the person is no longer detected within the approach detection range DZ2.

Thus, not only can the electronic apparatus 1 detect the approach of a person as soon as possible by detecting the person within the approach detection range DZ2 when the person approaches from a distance, but the electronic apparatus 1 can also detect the leave of a person even when the person has left without approaching the leave detection range DZ1.

Further, the above-mentioned detection ranges are detection ranges each defined by the distance and the angle with respect to the electronic apparatus 1. The leave detection range DZ1 and the approach detection range DZ2 are so set that either one or both of the distance and the angle are different from each other.

Thus, the electronic apparatus 1 can detect the approach and leave of a user properly by using either one or both of the distance and the angle of a person with respect to the electronic apparatus 1.

As an example, the above-mentioned detection ranges are detection ranges each defined by the distance with respect to the electronic apparatus 1. For example, the leave detection range DZ1 is a range from the electronic apparatus 1 to the leave detection distance KD1 (an example of a first detection distance), and the approach detection range DZ2 is a range from the electronic apparatus 1 to the approach detection distance KD2 (an example of a second detection distance). The approach detection distance KD2 is a distance longer than the leave detection distance KD1.

Thus, not only can the electronic apparatus 1 detect the leave of a person as long as the person goes out of the leave detection distance KD1 even when the person gets slightly away from the electronic apparatus 1, but the electronic apparatus 1 can also detect the approach of a person as soon as possible as long as the person goes into the approach detection range DZ2 when the person approaches from a distance (approaches to use the electronic apparatus 1). Further, even in the case where the leave of a person is detected by getting slightly away from the electronic apparatus 1, when the person approaches straight to use the electronic apparatus 1 again without approaching after once getting far away (going out of the approach detection distance KD2), the electronic apparatus 1 can detect the approach of the person properly.

As another example, the above-mentioned detection ranges are detection ranges each defined by the angle with respect to the electronic apparatus 1. For example, the leave detection range DZ1 is a range of the leave detection field of view FoV1 (an example of a first detection field of view) with respect to the electronic apparatus 1, and the approach detection range DZ2 is a range of the approach detection field of view FoV2 (an example of a second detection field of view) with respect to the electronic apparatus 1. The approach detection field of view FoV2 is an angle wider than the leave detection field of view FoV1.

Thus, not only can the electronic apparatus 1 detect the leave of a person as long as the person goes out of the leave detection field of view FoV1 even when the person gets slightly away from the electronic apparatus 1, but the electronic apparatus 1 can also detect the approach of a person as soon as possible as long as the person goes into the approach detection field of view FoV2 when the person approaches from a distance (approaches to use the electronic apparatus 1). Further, even in the case where the leave of a person is detected by getting slightly away from the electronic apparatus 1, when the person approaches straight to use the electronic apparatus 1 again without approaching after once getting far away (going out of the approach detection range DZ2), the electronic apparatus 1 can detect the approach of the person properly.

Further, the electronic apparatus 1 includes the system processing unit 300 (an example of a processing unit) which executes system processing based on the system, and the operation control unit 220 which controls the operating state of the system. When it is determined by the leave determination unit 211 that a person has left, the operation control unit 220 causes the operating state of the system to make the transition to the standby state in which at least part of the system processing is limited (an example of a first operating state). On the other hand, when it is determined by the approach determination unit 212 that a person has approached, the operation control unit 220 activates the operating state from the standby state.

Thus, the electronic apparatus 1 can control the operation of the system processing properly according to the approach or leave of a person. For example, since the electronic apparatus 1 can make the transition to the standby state even when the person gets slightly away from the electronic apparatus 1, the security can be improved. Further, since the electronic apparatus 1 boots up as soon as possible when the person approaches from a distance (approaches to use the electronic apparatus 1), the usability is good.

Further, even in the case where the electronic apparatus 1 becomes the standby state due to the fact that the person gets a little distance away from the electronic apparatus 1, since the electronic apparatus 1 boots up when the person approaches straight to use the electronic apparatus 1 again without approaching after once getting far away, it is convenient. For example, in the case where the electronic apparatus 1 becomes the standby state due to the fact that the person gets a little distance away from the electronic apparatus 1, the electronic apparatus 1 boots up when the person returns to the original position before getting away from the electronic apparatus 1 to use the electronic apparatus 1 again without approaching after once getting far away, it is convenient. Further, since the electronic apparatus 1 can boot up when the person stretches out his or her hands and the hands are detected within the leave detection range DZ1 without the need for the person to move his or her body, it is convenient. Further, the electronic apparatus 1 boots up as soon as possible by detecting the person within the approach detection range DZ2 when the person approaches from a distance. In this case, even when the person gets away from the electronic apparatus 1 without approaching the leave detection range DZ1, since the electronic apparatus 1 makes the transition to the standby state, the security can be improved.

Second Embodiment

Next, a second embodiment of the present invention will be described.

Since the basic configuration of the electronic apparatus 1 according to this embodiment is the same as that in the first embodiment, characteristic processing in this embodiment will be described. In the first embodiment, the example in which the electronic apparatus 1 detects a person within the leave detection range DZ1 at the time when the person detected in the tracking range TZ gets closer to the electronic apparatus 1 over the boundary of the leave detection distance KD1 and determines that the person has approached is described (see FIG. 5). On the other hand, in this embodiment, an example of determining that a person has approached based on the amount of change in the detection position of the person detected in the tracking range TZ will be described.

Figure 13:
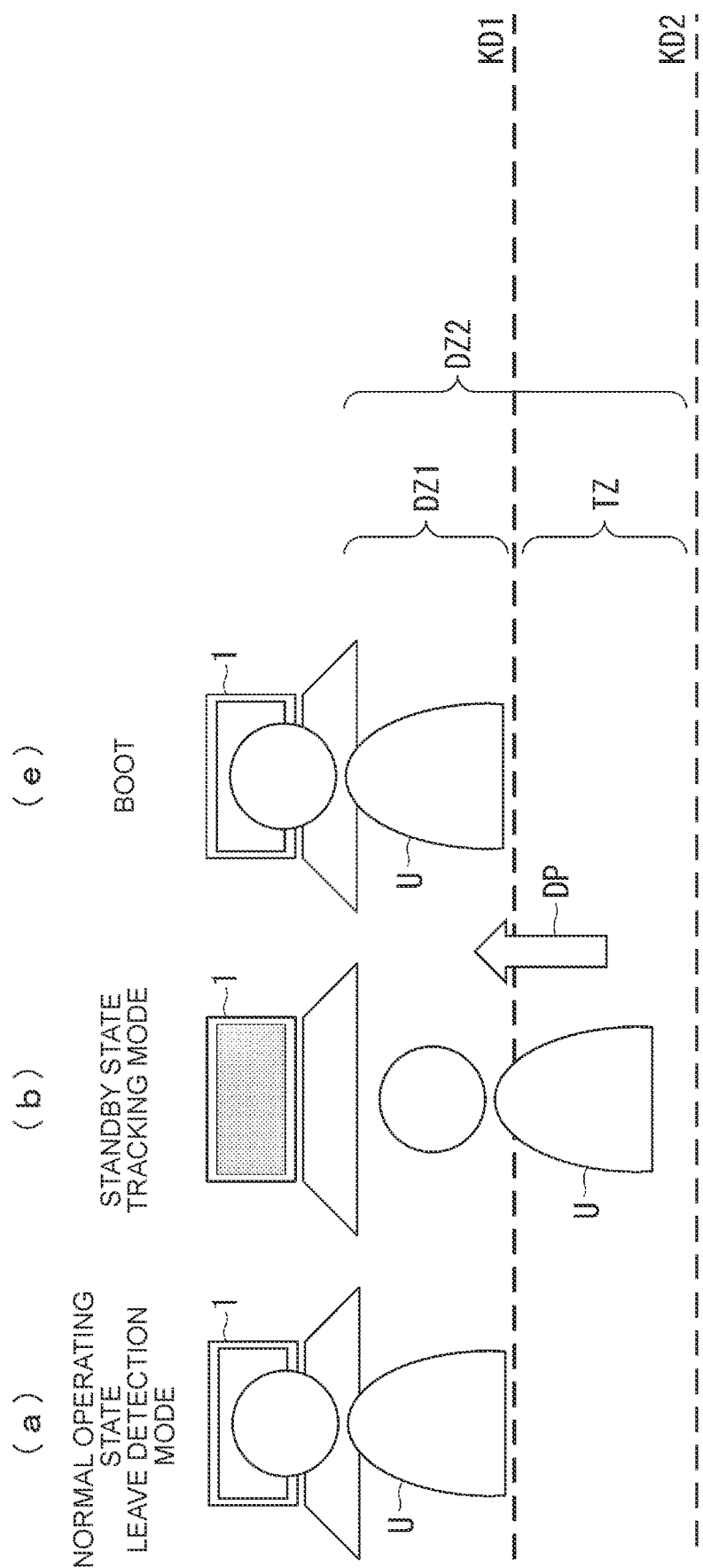
FIG. 13 is an explanatory illustration on approach detection in the tracking mode according to a second embodiment.

FIG. 13 is an explanatory illustration on approach detection in the tracking mode according to the embodiment. In FIG. 13, the operating states and the detection modes of the electronic apparatus 1, and the detection positions of the person U in (a), (b), and (e) are the same as those at (a), (b), and (e) illustrated in FIG. 5. Here, only the processing to determine that the person has approached the electronic apparatus 1 at (b) is different from the example illustrated in FIG. 5.

As indicated at (b), in the state where the electronic apparatus 1 is detecting the person U within the tracking range TZ, the detection mode is the tracking mode. In the tracking mode, the electronic apparatus 1 tracks the detection position of the person U and determines that the person U has approached based on the fact that the detection position gets closer toward the leave detection range DZ1. Specifically, in the embodiment, the electronic apparatus 1 determines that the person U has approached when the amount of change DP in the detection position of the person U indicated at (b) in a direction toward the leave detection range DZ1 (over the boundary of the leave detection distance KD1) (that is, the direction of the electronic apparatus 1) is equal to or more than a predetermined value. The amount of change DP is a directional component toward the electronic apparatus 1 in the amount of movement of the detection position of the person U. The predetermined value is a preset value (for example, 30 cm), but it can also be set arbitrarily in connection with the set value of the leave detection distance KD1 or the like. The predetermined value may also be settable by the user. Note, for example, that the tracking range TZ may be set to a range from the electronic apparatus 1 to the approach detection distance KD2 (that is, the same range as the approach detection range DZ2).

Figure 14:
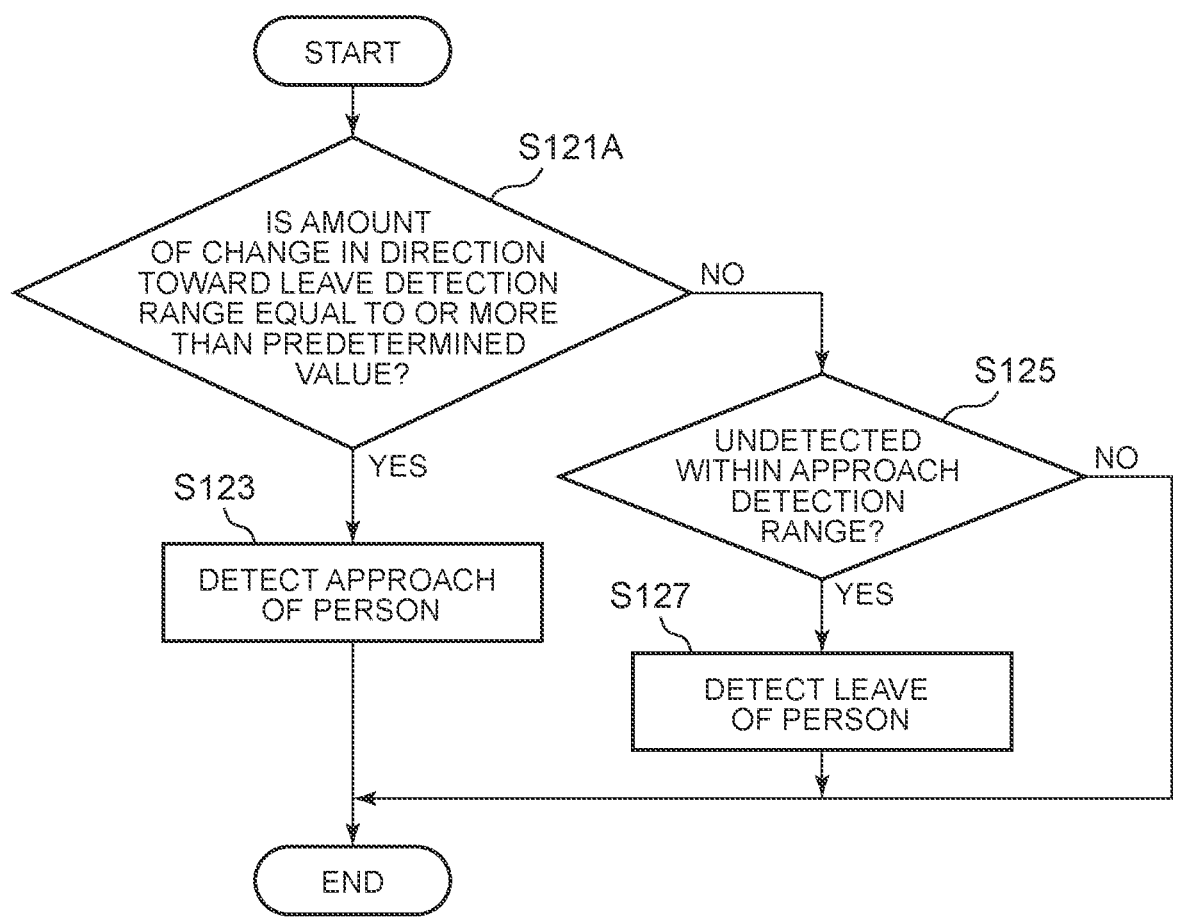
FIG. 14 is a flowchart illustrating an example of leave or approach detection processing in the tracking mode according to the second embodiment.

FIG. 14 is a flowchart illustrating an example of leave or approach detection processing in the tracking mode according to the embodiment. In FIG. 14, the same processing steps as those illustrated in FIG. 9 are given the same reference numerals to omit the description thereof. In the embodiment, only processing in step S121A is different from the processing in step S121 illustrated in FIG. 9. In step S121A, the approach determination unit 212 determines whether the detection position of a person detected within the tracking range TZ moves toward the leave detection range DZ1 (that is, toward the electronic apparatus 1) or not. Specifically, based on the detection result by the person detection unit 210, the approach determination unit 212 determines whether the amount of change in the detection position of the person detected within the tracking range TZ in a direction toward the leave detection range DZ1 is equal to or more than the predetermined value or not. For example, when determining that the amount of change in the detection position of the person in the direction toward the leave detection range DZ1 is equal to or more than the predetermined value (YES), the approach determination unit 212 determines that the person has approached (step S123). On the other hand, when determining in step S121A that the amount of change in the detection position of the person in the direction toward the leave detection range DZ1 is less than the predetermined value (NO), the approach determination unit 212 proceeds to processing in step S125.

As described above, in the case where the person determined by the leave determination unit 211 to have left is detected within the approach detection range DZ2, the approach determination unit 212 in the electronic apparatus 1 of the embodiment determines that the person has approached when the amount of change in the detection position of the person in the direction toward the leave detection range DZ1 is equal to or more than the predetermined value.

Thus, the electronic apparatus 1 can detect the approach and leave of a person properly. For example, even when a person is detected to have left by getting slightly away from the electronic apparatus 1, the electronic apparatus 1 can detect the approach of the person properly when the person approaches straight to use the electronic apparatus 1 again without approaching after once getting far away (going out of the approach detection range DZ2).

Third Embodiment

Next, a third embodiment of the present invention will be described.

In the embodiment, an example of using the processing in the tracking mode according to the second embodiment to detect the approach of a person even when the electronic apparatus 1 makes the transition to the standby state for any reason other than that the leave of the person is detected will be described.

Figure 15:
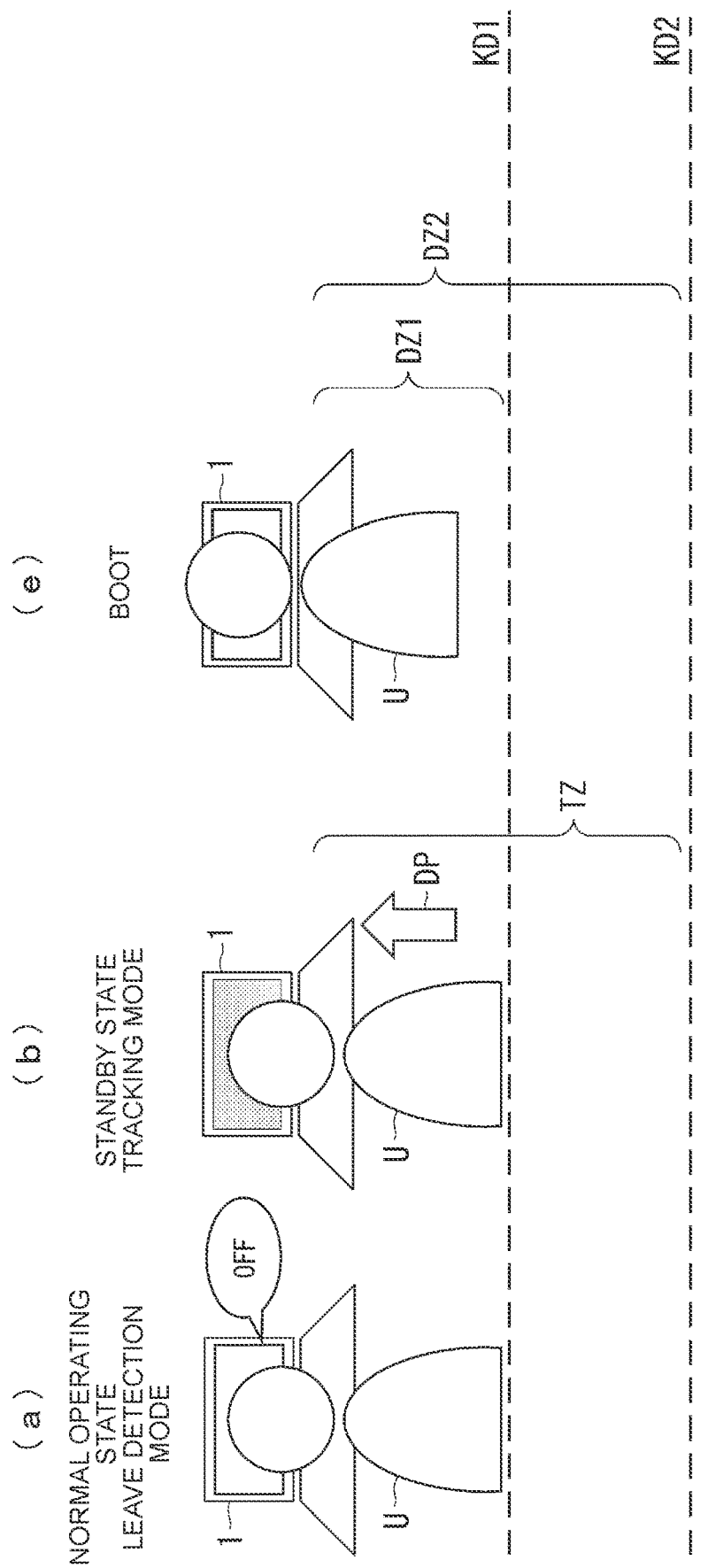
FIG. 15 is an explanatory illustration on approach detection in the tracking mode according to a third embodiment.

FIG. 15 is an explanatory illustration on approach detection in the tracking mode according to the embodiment. In FIG. 15, the operating states of the electronic apparatus 1 and the detection positions of the detection modes are the same as those at (a), (b), and (e) illustrated in FIG. 13. Different points are a trigger at which the electronic apparatus 1 makes the transition from the normal operating state to the standby state, and the positional relationship of the person U. (a) indicates a state where the electronic apparatus 1 is detecting the person U within the leave detection range DZ1, which means that a power button (not illustrated) of the electronic apparatus 1 is pressed down (an OFF operation). In this case, as indicated at (b), the electronic apparatus 1 makes the transition from the normal operating state to the standby state. Further, the detection mode makes a transition from the leave detection mode to the tracking mode. The tracking range TZ is, for example, set to a range from the electronic apparatus 1 to the approach detection distance KD2 (that is, the same range as the approach detection range DZ2). Thus, even in the case where the person U is being detected within the leave detection range DZ1, when the amount of change DP in the detection position of the person U in the direction of the leave detection range DZ1 (the leave detection distance KD1) (that is, the direction of the electronic apparatus 1) is equal to or more than the predetermined value, the electronic apparatus 1 can determine that the person U has approached.

In the embodiment, the trigger to cause the electronic apparatus 1 to make the transition from the normal operating state to the standby state is not limited to pressing down the power button (not illustrated). For example, it may be an operation to select screen lock, the fact that the duration of non-operation has lasted for a preset period, or the like.

Further, in the detection mode control processing according to the embodiment, it has only to add the following to the detection mode control processing in FIG. 7. In the case where the person detection unit 210 detects a person within the leave detection range DZ1 in step 100, when the electronic apparatus 1 is in the normal operating state, the detection mode is set to the leave detection mode and the procedure proceeds to the processing in step S110, while when the electronic apparatus 1 makes the transition from the normal operating state to the standby state, the detection mode is set to the tracking mode and the procedure proceeds to the processing in step S120. Further, in this case, the processing illustrated in FIG. 14 can be applied to leave or approach detection processing in the tracking mode.

As described above, the electronic apparatus 1 according to the embodiment includes the system processing unit (the example of the processing unit) which executes system processing. Then, when the operating state becomes the standby state in which at least part of the system processing executed by the system processing unit 300 is limited, the leave determination unit 211 determines that the person has approached based on the fact that the detection position of the person moves toward the leave detection range DZ1.

Thus, the electronic apparatus 1 can detect the approach and leave of a person properly. For example, even in the case where the electronic apparatus 1 has made the transition to the standby state due to any factor other than the leave of the person, since the electronic apparatus 1 can detect the approach of the person to boot up from the standby state when the person approaches straight (or stretches out his or her hands), it is convenient.

While the embodiments of this invention have been described in detail above with reference to the accompanying drawings, the specific configuration is not limited to the above-described embodiments, and design changes without departing from the scope of this invention are included. Respective components described in the above-described embodiments can be combined arbitrarily.

Further, upon setting the detection ranges depending on the detection mode in the above embodiments, the settings of both of the detection distance and the detection field of view may be changed, or the setting of either one of the detection distance and the detection field of view may be changed.

Further, in the above embodiments, the example in which the approach detection distance KD2 is a distance longer than the leave detection distance KD1 and the approach detection field of view FoV2 is an angle wider than the leave detection field of view FoV1 is described, but the present invention is not limited to this example. For example, the approach detection field of view FoV2 may be an angle narrower than the leave detection field of view FoV1 though the approach detection distance KD2 is a distance longer than the leave detection distance KD1. As an example, the leave detection field of view FoV1 may be set to 60°, and the approach detection field of view FoV2 may be set to 30°. In this case, not only can the electronic apparatus 1 detect the leave of a person even when the person gets slightly away from the electronic apparatus 1, but the electronic apparatus 1 can also prevent the leave of the person from being detected just as the person moved slightly to the right and left. For example, not only can the electronic apparatus 1 make the transition to the standby state even when the person gets slightly away from the electronic apparatus 1, but the electronic apparatus 1 can also prevent the transition to the standby state just as the person moved slightly to the right and left. On the other hand, not only can the electronic apparatus 1 detect the approach of a person as soon as possible when the person approaches from a distance (approaches to use the electronic apparatus 1), but the electronic apparatus 1 can also prevent the approach of the person from being detected when the person is not approaching directly in front of the electronic apparatus 1. For example, not only can the electronic apparatus 1 boot up as soon as possible when the person approaches from a distance (approaches to use the electronic apparatus 1), but the electronic apparatus 1 can also prevent the bootup when the person is not approaching directly in front of the electronic apparatus 1. At the timing of using the electronic apparatus 1 again after the person leaves the electronic apparatus 1, since there is a need for the person to approach directly in front of the electronic apparatus 1 due to the authentication processing, unnecessary bootup can be prevented under conditions other than the approach of the person directly in front of the electronic apparatus 1.

In the above description, the case where the proximity sensor 130 is mainly an infrared sensor module is taken as an example, but the present invention is not limited thereto. The proximity sensor 130 has only to include plural detection elements capable of detecting wave energy coming from a person in a non-contact manner. The wave energy coming from an object such as a person includes reflected waves reflected on the object and wave energy emitted from the object itself as mentioned above. In addition to infrared light and visible light, the wave energy may be radio waves shorter in wavelength than the infrared light. The proximity sensor 130 may also be, for example, a radar sensor module (not illustrated). For example, when the proximity sensor 130 detects radio waves, an object such as a person may be detected based on the intensity of radio waves received at a receiving antenna, or the object such as the person may be detected based on a difference in reception time when radio waves transmitted from a transmitting antenna are received two or more receiving antennas. In this case, the detectable range of the proximity sensor 130 corresponds to a receivable range of the receiving antenna, and use of part of the receiving antenna can lead to detecting the object such as the person based on a detection signal detected in a range as part of the detectable range. Even when the proximity sensor 130 detects radio waves, the detection range can be narrowed down to reduce transmission power and reception power and hence to reduce power consumption.

Further, in the standby state described above, a hibernation state, a power-off state, or the like may also be included. The hibernation state corresponds, for example, to S4 state defined in the ACPI specification. The power-off state corresponds, for example, to S5 state (shutdown state) defined in the ACPI specification. Further, the standby state may be a state in which at least the display of the display unit appears to be OFF (screen OFF) as described above, or may include a screen lock state. The screen lock is a state where an image preset to make processed content invisible (for example, an image for the screen lock) is displayed on the display unit to indicate that the system is unusable until the lock is released (for example, user authentication is performed).

Further, in the above embodiments, the EC 200 configured to operate independently of the system processing unit 300 may be any processing unit such as a sensor hub or a chipset, and the above-described processing may be executed by any processing unit other than the EC 200 instead of the EC 200. It is usually the case that the sum of power consumption of the processing unit such as this EC 200 and the proximity sensor 130 is significantly less than the power consumption of the system processing unit 300.

Note that the above-described electronic apparatus 1 has a computer system therein. Then, a program for implementing the function of each component included in the above-described electronic apparatus 1 may be recorded on a computer-readable recording medium so that the program recorded on this recording medium is read into the computer system and executed to perform processing in each component included in the above-described electronic apparatus 1.

Here, the fact that "the program recorded on this recording medium is read into the computer system and executed" includes installing the program on the computer system. It is assumed that the "computer system" here includes the OS and hardware such as a peripheral device and the like. Further, the "computer system" may also include two or more computers connected through a network including the Internet, WAN, LAN, and a communication line such as a dedicated line. Further, the "computer-readable recording medium" means a storage medium such as a flexible disk, a magneto-optical disk, a ROM, a portable medium like a CD-ROM, or a hard disk incorporated in the computer system. The recording medium with the program thus stored thereon may be a non-transitory recording medium such as the CD-ROM.

A recording medium internally or externally provided to be accessible from a delivery server for delivering the program is included as the recording medium. Note that the program may be divided into plural pieces, downloaded at different timings, respectively, and then united in each component included in the electronic apparatus 1, or delivery servers for delivering respective divided pieces of the program may be different from one another. Further, the "computer-readable recording medium" includes a medium on which the program is held for a given length of time, such as a volatile memory (RAM) inside a computer system as a server or a client when the program is transmitted through the network. The above-mentioned program may also be to implement some of the functions described above. Further, the program may be a so-called differential file (differential program) capable of implementing the above-described functions in combination with a program(s) already recorded in the computer system.

Further, some or all of the functions of the electronic apparatus 1 may be realized as an integrated circuit such as LSI (Large Scale Integration). Each function may be a processor implemented individually, or part or whole thereof may be integrated as a processor. Further, the method of circuit integration is not limited to LSI, and it may be realized by a dedicated circuit or a general-purpose processor. Further, if integrated circuit technology replacing the LSI appears with the progress of semiconductor technology, an integrated circuit according to the technology may be used.

Further, the electronic apparatus 1 in the above-described embodiments is not limited to a PC, a tablet terminal, or a smartphone, and embodiments of the present invention can also be applied to a household electric appliance or a commercial electric appliance. As the household electric appliance, embodiments of the present invention can be applied to a TV set, a refrigerator or a microwave oven having a display unit, or the like. For example, ON/OFF of a TV screen or ON/OFF of a screen of the display unit of the refrigerator or the microwave oven can be controlled in response to the approach or leave of a person. As the commercial electric appliance, embodiments of the present invention can be applied to a vending machine, a multimedia station, or the like. For example, an operating state such as ON/OFF of lighting of the vending machine or ON/OFF of a screen of a display unit of the multimedia station can be controlled in response to the approach or leave of a person.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

DESCRIPTION OF SYMBOLS

1 . . . electronic apparatus, 10 . . . first chassis, 20 . . . second chassis, 15 . . . hinge mechanism, 110 . . . display unit, 120 . . . imaging unit, 130 . . . proximity sensor, 150 . . . input device, 151 . . . keyboard, 153 . . . touch pad, 200 . . . EC, 210 . . . person detection unit, 211 . . . leave determination unit, 212 . . . approach determination unit, 220 . . . operation control unit, 300 . . . system processing unit, 302 . . . CPU, 304 . . . GPU, 306 . . . memory controller, 308 . . . I/O controller, 310 . . . system memory, 312 . . . authentication processing unit, 350 . . . communication unit, 360 . . . storage unit, 400 . . . power supply unit.

What is claimed is:

1. An electronic apparatus comprising:
a detector that detects an object present within a predetermined detection range; and
an embedded controller that, based on a detection result by the detector, determines that:
the object has left the electronic apparatus when the object is no longer detected within a first detection range of the predetermined detection range after the object has previously been detected within the first detection range, and
the object has approached the electronic apparatus after the object is detected within a second detection range wider than the first detection range when no objects were previously detected within the predetermined detection range, wherein
while the object determined to have left is detected within the second detection range, the embedded controller further determines that the object has re-approached the electronic apparatus based on a detection position of the object moving toward the first detection range, and
the embedded controller further tracks the object by detecting changes in the detection position of the object as the object moves through a tracking range from the second detection range to the first detection range, and determines a distance of the changes in the detection position of the object.

2. The electronic apparatus according to claim 1, wherein in a case where the object determined to have left is detected within the second detection range, when an amount of change in the detection position of the object in a direction of the first detection range is equal to or more than a predetermined value, the embedded controller determines that the object has approached.

3. The electronic apparatus according to claim 1, further comprising:
a processor that executes system processing, wherein
upon becoming a state in which at least part of the system processing executed by the processor is limited, the embedded controller determines that the object has approached based on the detection position of the object moving toward the first detection range.

4. The electronic apparatus according to claim 1, wherein when the object determined to have left is detected within the second detection range, the embedded controller determines that the object has re-approached in response to the object being detected within the first detection range again.

5. The electronic apparatus according to claim 1, wherein while the object determined to have approached is detected within any range of the second detection range other than the first detection range, the embedded controller determines that the object has left in response to the object no longer being detected within the second detection range.

6. The electronic apparatus according to claim 1, wherein the predetermined detection range is defined by a distance and an angle with respect to the electronic apparatus, and
the first detection range and the second detection range are set to cause at least one of the distance and the angle of the first detection range to be different from that of the second detection range.

7. The electronic apparatus according to claim 1, wherein the predetermined detection range is defined by the distance with respect to the electronic apparatus,
the first detection range is from the electronic apparatus to a first detection distance,
the second detection range is from the electronic apparatus to a second detection distance, and
the second detection distance is longer than the first detection distance.

8. The electronic apparatus according to claim 1, wherein the predetermined detection range is defined by an angle with respect to the electronic apparatus,
the first detection range is within a first detection field of view with respect to the electronic apparatus,
the second detection range is within a second detection field of view with respect to the electronic apparatus, and
the second detection field of view is wider than the first detection field of view.

9. The electronic apparatus according to claim 7, wherein the predetermined detection range is defined by an angle with respect to the electronic apparatus,
the first detection range is within a first detection field of view with respect to the electronic apparatus,
the second detection range is within a second detection field of view with respect to the electronic apparatus, and
the second detection field of view is narrower than the first detection field of view.

10. The electronic apparatus according to claim 1, further comprising:
a processor that executes system processing based on a system; and
an operation controller that causes, when the object is determined to have left, an operating state of the system to make a transition to a first operating state in which at least part of the system processing is limited and that activates the operating state of the system from the first operating state when the object is determined to have approached.

11. A control method for an electronic apparatus comprising:
causing a detector to detect whether an object is present within a predetermined detection range;
causing an embedded controller, based on a detection result by the detector, to determine that:
the object has left the electronic apparatus when the object is no longer detected within a first detection range of the predetermined detection range after the object has previously been detected within the first detection range, and
the object has approached the electronic apparatus after the object is within a second detection range in the predetermined detection range wider than the first detection range when no objects were previously detected within the predetermined detection range;
causing the embedded controller to further determine that the object has re-approached based on a detection position of the object moving toward the first detection range while the object determined to have left is detected within the second detection range; and
causing the embedded controller to further track the object by detecting changes in the detection position of the object as the object moves through a tracking range from the second detection range to the first detection range, and to determine a distance of the changes in the detection position of the object.

12. A computer comprising:
a sensor that detects an object within a predetermined detection range; and
a processor coupled to the sensor, the processor being configured to:
detect a leave when detecting the object moving away across a leave distance within the predetermined detection range, and
detect an approach when detecting the object moving closer across an approach distance within the predetermined detection range, the approach distance being farther than the leave distance, wherein
the processor is configured to further detect an approach when, after detecting a leave by a particular object, detecting the particular object moving closer across the leave distance without having moved away across the approach distance.

* * * * *